United States Patent
Aronoff et al.

(10) Patent No.: US 7,606,839 B2
(45) Date of Patent: Oct. 20, 2009

(54) SYSTEMS AND METHODS FOR PROVIDING CLIENT CONNECTION FAIL-OVER

(75) Inventors: Eyal Aronoff, Irvine, CA (US); Eyal Kalderon, Aliso Viejo, CA (US); William J. Romine, Aliso Viejo, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 230 days.

(21) Appl. No.: 11/754,891

(22) Filed: May 29, 2007

(65) Prior Publication Data

US 2007/0226220 A1    Sep. 27, 2007

Related U.S. Application Data

(63) Continuation of application No. 10/661,412, filed on Sep. 11, 2003, now Pat. No. 7,231,391, which is a continuation-in-part of application No. 10/072,317, filed on Feb. 6, 2002, now abandoned.

(60) Provisional application No. 60/266,908, filed on Feb. 6, 2001.

(51) Int. Cl.
    *G06F 17/30*    (2006.01)
(52) U.S. Cl. .......................... 707/201; 707/10
(58) Field of Classification Search ............ 707/10, 707/200, 201
    See application file for complete search history.

(56) References Cited

U.S. PATENT DOCUMENTS

| 4,130,867 A | 12/1978 | Bachman et al. |
|---|---|---|
| 5,222,235 A | 6/1993 | Hintz et al. |
| 5,297,279 A | 3/1994 | Bannon et al. |
| 5,325,505 A | 6/1994 | Hoffecker et al. |
| 5,333,314 A | 7/1994 | Masai et al. |
| 5,422,979 A | 6/1995 | Eichfeld et al. |
| 5,423,037 A | 6/1995 | Hvasshovd |
| 5,440,727 A | 8/1995 | Bhide et al. |
| 5,455,945 A | 10/1995 | VanderDrift |
| 5,551,020 A | 8/1996 | Flax et al. |
| 5,553,303 A | 9/1996 | Hayashi et al. |
| 5,596,747 A | 1/1997 | Katabami et al. |
| 5,603,026 A | 2/1997 | Demers et al. |
| 5,625,811 A | 4/1997 | Bhide et al. |
| 5,634,052 A | 5/1997 | Morris |
| 5,655,081 A | 8/1997 | Bonnell et al. |

(Continued)

OTHER PUBLICATIONS

Computer Associates, "Platinum Tsreorg Automates Tablespace Reorganizations, Customer Story", http://platinum.com/products/custstor/tsreorg.htm, 2 pages downloaded and printed from the World Wide Web on Nov. 30, 1999.

(Continued)

*Primary Examiner*—Cheryl Lewis
(74) *Attorney, Agent, or Firm*—Knobbe, Martens, Olson & Bear, LLP

(57) ABSTRACT

Aspects of embodiments of the present disclosure include a highly available database cluster employing replication between two or more data files. The cluster also can maintain a connection with potentially geographically remote client application programs, including non-fault tolerant application programs, even in the event of one of the database management systems (DBMS) of the cluster becoming unavailable.

20 Claims, 12 Drawing Sheets

U.S. PATENT DOCUMENTS

| | | | |
|---|---|---|---|
| 5,675,791 | A | 10/1997 | Bhide et al. |
| 5,721,915 | A | 2/1998 | Sockut et al. |
| 5,761,677 | A | 6/1998 | Senator et al. |
| 5,774,717 | A | 6/1998 | Porcaro |
| 5,778,377 | A | 7/1998 | Marlin et al. |
| 5,778,392 | A | 7/1998 | Stockman et al. |
| 5,796,934 | A | 8/1998 | Bhanot et al. |
| 5,799,322 | A | 8/1998 | Mosher, Jr. |
| 5,822,780 | A | 10/1998 | Schutzman |
| 5,848,416 | A | 12/1998 | Tikkanen |
| 5,893,924 | A | 4/1999 | Vakkalagadda |
| 5,933,818 | A | 8/1999 | Kasravi et al. |
| 5,933,820 | A | 8/1999 | Beier et al. |
| 5,940,832 | A | 8/1999 | Hamada et al. |
| 5,943,677 | A | 8/1999 | Hicks |
| 5,948,108 | A | 9/1999 | Lu et al. |
| 5,951,694 | A | 9/1999 | Choquier et al. |
| 5,951,695 | A | 9/1999 | Kolovson |
| 5,956,489 | A | 9/1999 | San Andres et al. |
| 5,956,504 | A | 9/1999 | Jagadish et al. |
| 5,978,594 | A | 11/1999 | Bonnell et al. |
| 5,983,239 | A | 11/1999 | Cannon |
| 5,991,761 | A | 11/1999 | Mahoney et al. |
| 5,995,958 | A | 11/1999 | Xu |
| 6,003,022 | A | 12/1999 | Eberhard et al. |
| 6,016,497 | A | 1/2000 | Suver |
| 6,026,412 | A | 2/2000 | Sockut et al. |
| 6,029,195 | A | 2/2000 | Herz |
| 6,067,545 | A | 5/2000 | Wolff |
| 6,070,170 | A | 5/2000 | Friske et al. |
| 6,119,128 | A | 9/2000 | Courter et al. |
| 6,122,640 | A | 9/2000 | Pereira |
| 6,151,607 | A | 11/2000 | Lomet |
| 6,157,932 | A | 12/2000 | Klein et al. |
| 6,253,212 | B1 | 6/2001 | Loaiza et al. |
| 6,256,634 | B1 | 7/2001 | Moshaiov et al. |
| 6,289,357 | B1 | 9/2001 | Parker |
| 6,343,296 | B1 | 1/2002 | Lakhamraju et al. |
| 6,377,959 | B1 | 4/2002 | Carlson |
| 6,411,964 | B1 | 6/2002 | Iyer et al. |
| 6,421,688 | B1 | 7/2002 | Song |
| 6,460,048 | B1 | 10/2002 | Teng et al. |
| 6,470,344 | B1 | 10/2002 | Kothuri et al. |
| 6,477,535 | B1 | 11/2002 | Mirzadeh |
| 6,519,613 | B1 | 2/2003 | Friske et al. |
| 6,523,035 | B1 | 2/2003 | Fleming et al. |
| 6,584,474 | B1 | 6/2003 | Pereira |
| 6,691,139 | B2 | 2/2004 | Ganesh et al. |
| 6,728,780 | B1 | 4/2004 | Hebert |
| 6,925,477 | B1 | 8/2005 | Champagne et al. |
| 7,003,531 | B2 * | 2/2006 | Holenstein et al. .......... 707/201 |
| 7,065,538 | B2 | 6/2006 | Aronoff et al. |
| 7,136,918 | B2 | 11/2006 | Urano et al. |
| 7,231,391 | B2 * | 6/2007 | Aronoff et al. ................. 707/8 |
| 7,401,251 | B1 * | 7/2008 | Haynes et al. ................. 714/5 |
| 7,509,535 | B1 * | 3/2009 | Gulve et al. ................... 714/43 |
| 7,512,682 | B2 * | 3/2009 | Aronoff et al. .............. 709/225 |
| 2002/0091712 | A1 | 7/2002 | Martin et al. |
| 2002/0111945 | A1 | 8/2002 | Young et al. |
| 2002/0129146 | A1 | 9/2002 | Aronoff et al. |
| 2006/0143246 | A1 | 6/2006 | Phillips et al. |

OTHER PUBLICATIONS

Computer Associates, "platinum OnlineReorg Technical Overview, OnlineReorg", http://platinum.com/products/dba/onreo)to.htm, 5 pages downloaded and printed from the World Wide Web on Nov. 30, 1999.

Computer Associates, "ProVision Tsreorg for Oracle, Brochure, Database Utilities TSreorg for Oracle", http://platinum.com/products/brochure/provis/pv_dr.htm, 4 pages downloaded and printed from the World Wide Web on Nov. 30, 1999.

Computer Associates, "rapid Reorg for DB2 for OS/390, Brochure", http://platinum.com/products/brochure/dm/b_rrd.htm, 3 pages downloaded and printed from the World Wide Web on Nov. 30, 1999.

"Space Management and Reorganization: Challenges and Solutions," http://www.quest.com/whitepapers/space_manager_wp.doc, published on or around Dec. 21, 1999.

"Top Five Tips for Space Management and Reorganization," believed to be published after Jul. 21, 1998.

"Quest SharePlex for Oracle," Brochure, Quest Software, Inc., Nov. 1999, 4 pages.

OnWire Technologies, Inc. NetRecorder Administrator's Guide, Version 2.1, pp. 1-38.

OnWire Technologies, Inc. NetRecorder User's Guide, Version 2.1, 1999, pp. 1-138.

* cited by examiner

SYSTEMS AND METHODS FOR PROVIDING CLIENT CONNECTION FAIL-OVER

RELATED APPLICATIONS

The present application is a continuation of U.S. patent application Ser. No. 10/661,412, U.S. Pat. No. 7,231,391, filed Sep. 11, 2003, which is a continuation-in-part of U.S. patent application Ser. No. 10/072,317, abandoned filed Feb. 6, 2002, entitled "HIGHLY AVAILABLE DATABASE CLUSTERS THAT MOVE CLIENT CONNECTIONS BETWEEN HOSTS," which claims the benefit of U.S. Provisional Patent Application No. 60/266,908, filed Feb. 6, 2001, entitled "HIGHLY AVAILABLE DATABASE CLUSTERS," each of which is hereby incorporated herein by reference in it is entirety.

BACKGROUND OF THE INVENTION

1. Field of the Invention

The present invention relates to the field of highly available database clusters. More specifically, the invention relates to database clusters that transparently move client connections from source systems to target systems having at least some data replicated from the source system.

2. Description of the Related Art

A database is generally considered to be a collection of information or data organized in a way that computer programs can quickly access or select desired portions of the collection. A database management system (DBMS) includes the collection of computer programs that enable the quick storage, selection, modification, and extraction of desired portions of data from the database. Exemplary DBMSs include those commercially available from Oracle Corporation, IBM, or the like. Application programs, on the other hand, typically include client programs that connect to a DBMS to provide users the ability to interact with the data of the database, such as, for example, to select, modify, organize, delete, or the like, some or all of the foregoing data. Exemplary application programs include payroll or inventory programs, online stores, or the like.

Often, the application programs are designed to be continually connected to a DBMS, thereby having substantially continuous access to data stored within the same. Unless specifically coded to recover, these application programs typically fail when their connection to the DBMS fails or is otherwise unavailable, such as during a system failure. For many application program environments, this failure is undesirable.

System designers have created various solutions to reduce the effects of an application program losing a connection to a DBMS. For example, system designers often employ database clusters to offer backup solutions to failed systems. Database clusters can include two or more DBMSs accessing shared data files. For example, the shared data files can include data files having the same set of data from the replication of changes from one DBMS to another. Also, the shared data files can include multiple DBMSs that access the same physical storage. Through the shared data files, system designers allow one DBMS to replace another in the event of a failure.

There are several drawbacks associated with the foregoing database clustering solution, especially when employed in environments allowing for little or no down time, such as, for example, high availability solutions. For example, when a DBMS fails, the connection from the application program to the DBMS can be lost, thereby potentially losing all open transactions from the same. Additionally, data not replicated from a failing DBMS can be lost. Moreover, during load balancing, simultaneous updates of the same data on different DBMSs can occur in some replication solutions. Also, a large amount of communication traffic among a cluster, and/or hardware limitations of the same, can reduce the cost effectiveness of geographically diverse systems. Moreover, as discussed, the failure of an individual DBMS results in a failure of non-fault tolerant program applications.

On the other hand, system designers may also employ application servers in order to reduce the effects of losing a connection to a DBMS. For example, system designers often have application programs connect to an application server, where the application server includes the functionality to recover lost client connections to one or more secondary DBMSs within a database cluster. However, the application server generally includes a proprietary protocol used in communications from the application program to the application server. The proprietary protocol is generally not native to the DBMS and therefore, each connecting application program will first be routed through the application server. Thus, the application server solution is not well suited for geographically diverse storage systems.

Embodiments of the present invention seek to overcome some or all of these and other problems.

SUMMARY OF THE INVENTION

Therefore, a need exists for a database cluster that can maintain a connection with potentially geographically remote client application programs, including non-fault tolerant application programs, even in the event of a failure or other unavailability of the primary DBMS. Accordingly, aspects of embodiments of the present disclosure include a highly available database cluster that can maintain a connection with potentially geographically remote client application programs, including non-fault tolerant application programs. For example, the database cluster can advantageously move a client connection between a failing, unbalanced, or overloaded DBMS, to another DBMS within the database cluster.

According to one embodiment, the database cluster includes connection managers which monitor a connection between a client application program and a primary DBMS. When one connection manager determines that the primary DBMS is unavailable, has an unbalanced share of the workload of the cluster, or the like, the connection manager of a secondary DBMS can assume the connection to the client application as if it were the primary DBMS. For example, the connection manager can finish all open transactions, thus avoiding the need to roll back the same. Embodiments of the connection managers can also monitor the connection at the DBMS communication level, such as, for example, the SQL*Net level. According to one embodiment, the connection managers capture enough information about the connection to restore the connection to its current state on another DBMS in the cluster.

Based on the foregoing, an aspect of an embodiment of the invention includes a method of providing highly-available database clusters which replicate at least one data file. The method comprises receiving one or more data requests from a client application over a first client connection, the one or more data requests requesting access to data of a first data file, and associating a timestamp with each data request. The method also comprises forwarding each data request to a first database management system capable of accessing the data of the first data file according to the data request, forwarding each data request and each associated timestamp to a memory, and forwarding replication data to the memory. The replication data is sufficient to indicate any changes made to the data of the first data file based on the one or more data requests. Each replication data includes a timestamp. The method further includes comparing the timestamps of one or more of the replication data to the timestamps of one or more of the data requests and when the one or more of the data requests are determined to be redundant to the one or more of the replication data based on the timestamps, purging one of (a) one or more of the data requests and (b) one or more of the replication data. The method also includes forwarding the other of (a) and (b) to a second database management system capable of accessing data of a second data file.

Another aspect of an embodiment of the invention includes a method of performing replication in a database cluster having client connection fail-over. The method comprises monitoring a first system with a second system. At least a portion of a first data file of the first system is replicated in a second data file of the second system. The method also includes determining a need to move communication over a first connection between a client application and the first data file through the first system to a second connection between the client application and the second data file through the second system, and moving the communication to the second connection in a manner allowing the client application to not fail.

For purposes of summarizing the invention, certain aspects, advantages and novel features of the invention have been described herein. Of course, it is to be understood that not necessarily all such aspects, advantages or features will be embodied in any particular embodiment of the invention.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

Aspects of embodiments of the present disclosure include a highly available database cluster that can move connections with one or more client program applications from a first host to a second in the event of, for example, a failure of the first host, an unbalanced or overloaded workload present on the first host, or the like. Additionally, the cluster can provide communication in the native protocol of underlying database management systems (DBMSs), thereby providing fault tolerant connections for potentially geographically remote and potentially non-fault tolerant client application programs.

According to one embodiment, the database cluster includes connection managers that monitor a connection between a client application program and a primary DBMS. When one connection manager determines that the primary DBMS is unavailable, has an unbalanced share of the workload of the cluster, or the like, the connection manager of a secondary DBMS can assume the connection to the client application as if it were the primary DBMS. In one embodiment, the assumption of the connection by the secondary connection manager is transparent to the client. Moreover, the secondary connection manager can replay or finish all open transactions, thus picking up the connection to the client in a state exactly where the primary DBMS failed. Embodiments of the connection managers can also monitor a connection at the DBMS communication level, such as, for example, the SQL*Net level. According to one embodiment, the connection managers capture enough information about the connection to restore the connection to its current state on another DBMS in the cluster.

According to one embodiment, the connection manager monitors a current state of TCP and IP protocols of a TCP/IP connection. When one connection manager determines that it should assume the TCP/IP connection, the connection manager continues the TCP conversation that the client originally started with the other connection manager.

The foregoing solution advantageously provides a database cluster offering high availability to its connecting clients, including non-fault tolerant clients, by moving connections between DBMSs within a database cluster.

To facilitate a complete understanding of the invention, the remainder of the detailed description describes the invention with reference to the drawings, wherein like reference numbers are referenced with like numerals throughout.

Figure 1:
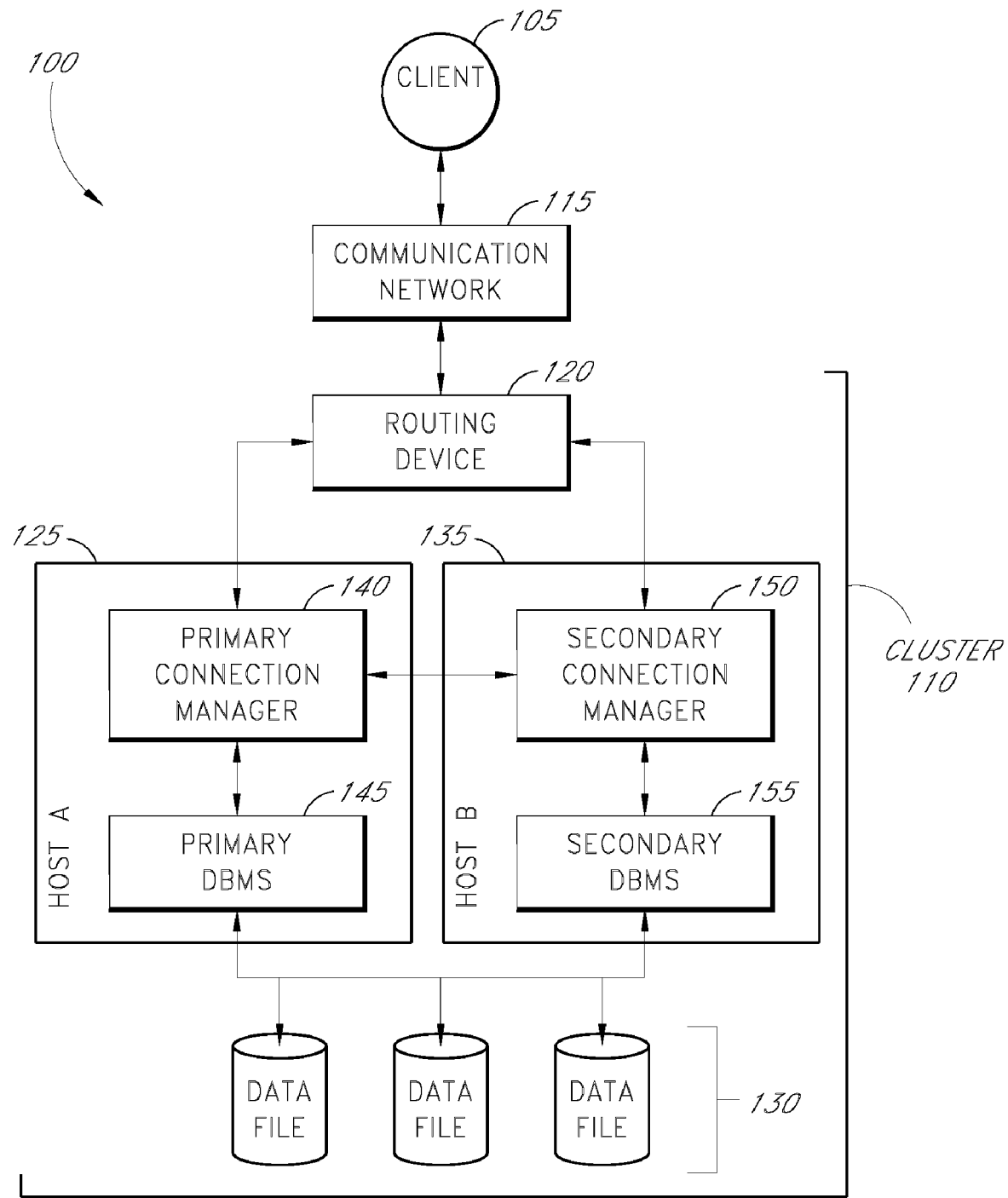
FIG. 1 illustrates a block diagram of an exemplary data processing system including a database cluster according to embodiments of the invention.

FIG. 1 illustrates a block diagram of an exemplary data processing system 100, according to an embodiment of the invention. As shown in FIG. 1, the data processing system 100 includes a client application program 105 (client 105) communicating with a highly available database cluster 110 (cluster 110) through a communication network 115. According to one embodiment, the client 105 comprises computer programs such as payroll or inventory programs, online stores, human resource applications, or the like, executing on one or more remote computer devices or systems.

An artisan will recognize from the disclosure herein that the client 105 can comprise virtually any client program designed to connect with a DBMS to interact with data stored therein, such as, for example, to select, modify, organize, delete, index, or the like, some or all of the foregoing data. Moreover, the artisan will recognize from the disclosure herein that the client 105 can execute on a wide variety of computer devices, such as, for example, personal digital assistants, mobile telephones, handheld computer devices, laptop computers, workstations, mainframe computers, combinations of the same, or the like.

The cluster 110 can comprise two or more DBMSs, able to access portions of shared, replicated, or otherwise mirrored data. Exemplary DBMSs include those commercially available from Oracle Corporation, IBM, or the like. According to one embodiment, the DBMSs of the cluster 110 execute on one or more hosts or other computing devices.

The communication network 115 comprises some or all of the Internet. However, an artisan will recognize from the disclosure herein that the communications network 115 can include a wide range of interactive communications mediums. For example, the communications network 115 can include interactive television networks, telephone networks, wireless data transmission systems, two-way cable systems, customized computer networks, interactive kiosk networks, automatic teller machine networks, direct links, private local or wide area networks, and the like.

In one embodiment, the client 105 connects to the cluster 110 through the communication network 115. The client 105 issues instructions or transactions including one or more operational statements to be carried out against data stored in data files accessible by the cluster 110. When the cluster 110 has executed the instructions or transactions, the cluster 110 returns an indication of the same to the client 105. Moreover, the cluster 110 can move the foregoing connection with the client 105 from a first host to a second in the event of, for example, a failure of the first host, an unbalanced or overloaded workload present on the first host, or the like. Additionally, the cluster 110 can provide communication in the native protocol of the underlying two or more DBMSs, thereby providing fault tolerant connections for the potentially geographically remote and potentially non-fault tolerant client 105. For example, the cluster 110 can monitor a connection at the DBMS communication level, such as, for example, a SQL*Net level. The cluster 110 can capture enough information about the connection to restore the connection to its current state on another DBMS in the cluster.

FIG. 1 also shows the cluster 110 including a routing device 120 communicating with a primary host 125 (Host A 125) to execute transactions against one or more shared data files 130. Additionally, FIG. 1 shows the routing device 120 having the ability to communicate with a secondary host 135 (Host B 135), which in turn also includes the ability to execute transactions against the one or more shared data files 130. According to one embodiment, Host A 125 includes a primary connection manager 140 and a primary DBMS 145, while Host B 135 includes a secondary connection manager 150 and a secondary DBMS 155. FIG. 1 also shows the primary connection manager 140 communicating with the secondary connection manager 150.

Routing device 120 comprises a device, such as, for example, a router, hub, or the like, that connects any number of computing systems or networks. Generally, routing device 120 uses information in data packets, along with a forwarding table to determine where the data packets go. According to one embodiment, the routing device 120 is configured in such as fashion as to forward all packets destined for the database cluster 110 to both the primary connection manager 140 and the secondary connection manager 150. An artisan will recognize that the function of such routing will be to enable a virtual IP address (VIP) that may be shared between hosts.

In one embodiment, the routing device 120 sends all data packets from the client 120 to both the primary connection manager 140 and the secondary connection manager 150. The secondary connection manager monitors statistics related to, for example, the number of clients connected to the primary connection manger. The primary connection manager assumes responsibility for the data packets send from the client 105 to the primary DBMS 145. Thus, when the client 105 sends transactions, in the form of data packets, through the communication network 115 to the primary DBMS 145, the data packets are routed to the primary connection manager 140, forming a connection between the primary connection manager 140 and the client 105. The primary connection manager 140 then forwards the data packets to the primary DBMS 145, forwards a copy of the data packets to the secondary connection manager 150, and monitors statistics related to, for example, the number of connected clients and the status of the secondary connection manager 150. Meanwhile, the secondary connection manager 150 receives the copied data packets, holds them in memory, and monitors statistics related to, for example, the number of connected clients and the status of the primary connection manager 140.

The primary DBMS 145 receives the data packets from the primary connection manager 140, assembles them into operational statements of transactions, and executes the same against the data files 130. The primary DBMS 145 then returns the requested data and/or acknowledgment of the received data packets back to the primary connection manager 140, which in turns forwards a copy to the secondary connection manager 150 and a copy to the respective client 105 through the communication network 115.

In an embodiment, the secondary connection manager 150 can detect a condition of the connection between the primary connection manager 140 and the client 105 from the statistics being monitored. For example, the secondary connection manager 150 can detect a failure of the connection, an unbalanced or overloaded workload on the primary connection, or the like. In such circumstances, the secondary connection manager assumes control of the connection and replays any rolled back transactions against the data files 130 through the secondary DBMS 155 as follows.

The secondary connection manager 150 communicates with the routing device 120 to acknowledge TCP requests from the client 105 to the primary connection manager 140. These acknowledgements advantageously keep the client TCP connection from timing out and failing. Additionally, the secondary connection manager 150 replays any operational statements of transactions rolled back due to, for example, the failure of the primary connection. As is generally known in the art, upon failure of a DBMS, all operational statements of open transactions (for, example, non-committed transactions) executed against the data files 130 are rolled back as if they never occurred. However, because the operational statements of open transactions are stored in the foregoing memory of the secondary connection manager 150, these operational statements from open transactions can be re-executed against the data files 130 through the secondary DBMS 155. After replaying the foregoing operational statements, the secondary connection manager 150 begins forwarding data packets from the client 105 to the secondary DBMS 155 to be executed against the data files 130.

Based on the foregoing disclosure, the database cluster 110 advantageously moves a connection between the primary DBMS 145 and the client 105 to the secondary DBMS 155 in the cluster 110, when the primary DBMS 145 fails, becomes unbalanced, overloaded, or the like. Additionally, the database cluster 110 advantageously replays any rolled back statements of open transactions during fail-over to the secondary DBMS 155, thereby providing an assumption of the connection that is transparent to the client 105. Accordingly, the cluster 110 avoids failure of non-fault tolerant clients by moving the connection rather than allowing it to fail. Additionally, the cluster 110 advantageously provides communication in the native protocol of the underlying two or more DBMSs, thereby providing fault tolerant connections for the potentially geographically remote and potentially non-fault tolerant client 105.

Figure 2:
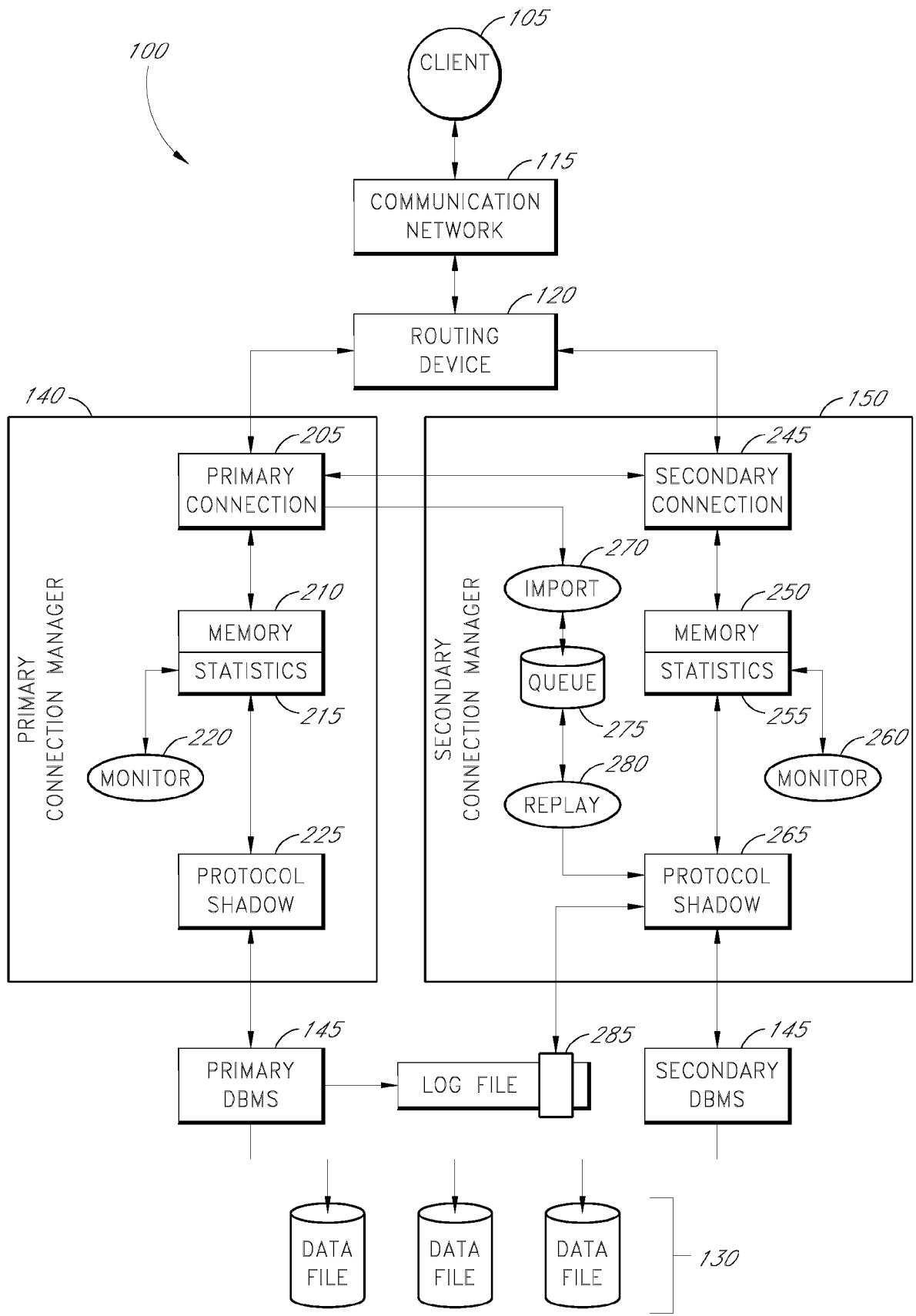
FIG. 2 illustrates a block diagram of exemplary connection managers of the database cluster of FIG. 1, according to embodiments of the invention.

FIG. 2 illustrates a block diagram of embodiments of the primary and secondary connection managers, 140 and 150, of the cluster 110, according to embodiments of the invention. FIG. 2 shows the primary connection manager 140 including a primary connection 205 communicating with a memory 210 including statistics 215, a monitor process 220 also communicating with the memory 210, and a protocol shadow 225 communicating with the memory 210 and the primary DBMS 145. Moreover, FIG. 2 shows the secondary connection manager 150 including a secondary connection 245 communicating with a memory 250 including statistics 255, a monitor process 260 also communicating with the memory 250, and a protocol shadow 265 communicating with the memory 250 and the secondary DBMS 155. In addition, the secondary connection manager 150 includes an import process 270 communicating with the primary connection 205 and a queue 275. The secondary connection manager 150 also includes a replay process 280 communicating with the queue 275 and the protocol shadow 265. Moreover, while not shown, an additional redo monitor can access one or more log files 285 associated with the primary DBMS 145. The redo monitor also can communicate with the memory 210 and review the statistics 215. FIG. 2 also shows the protocol shadow 265 accessing the one or more log files 285.

The following simplified exemplary transactions are disclosed to provide an understanding of the operation of the primary and secondary connection managers, 140 and 150 respectively, however, they are not intended to limit the scope of the disclosure. Rather, an artisan will recognize from the disclosure herein, alternative arrangements to simplify or expand one or more of the features or aspects disclosed herein.

Normal Operation

When the client 105 begins a transaction by issuing an operational statement to be applied against the data files 130, the client 105 distributes the statement across one or more data packets. The data packets are forwarded through the communication network 115 to the routing device 120, where, as disclosed, the routing device 120 forwards the packets to the primary connection 205 and to the secondary connection 245. The primary connection 205 examines statistics in the statistics 215 generated by the redo monitor. These statistics include, for example, the current location of transaction being stored in the log files 285. The primary connection transmits a copy of each data packet along with the current log file location, such as a sequence number, to the import process 270 of the secondary connection manager 150, and places a copy in the memory 210. The import process 270 stores the data packets in the queue 275. The protocol shadow 225 accesses the memory 210 and retrieves the data packets. The protocol shadow 225 forwards the packets to the primary DBMS 145, where the packets are assembled and the operational statement executed against the data files 130. Moreover, as is generally known in the art, the DBMS can also keep a record or log of the executed statement, generally in the log file 285.

The DBMS 145 forwards a result of the statement and/or and acknowledgement of receipt of the same, back to the protocol shadow 225, preferably in one or more acknowledgement data packets. The protocol shadow 225 transfers the data packets back to the memory 210, where they are picked up by the primary connection 205. The primary connection 205 forwards a copy of the data packets to the import process 270 and to the client 105. Thus, the client 105 receives the results and/or acknowledgement of the transmitted statement of an open transaction.

The client 105 may then desire to finalize, or commit the transaction against the data files 130. In such case, the client 105 issues a commit statement, which is forwarded to the primary DBMS 145 and the import process 270, along with the subsequent result and/or acknowledgement, in a manner similar to that disclosed. In one embodiment, the protocol shadow 225 stores sufficient data from the data packets that it can assemble the statements of a given transaction. When the protocol shadow 225 determines the data packets for a commit statement have been sent to the primary DBMS 145, the protocol shadow attaches a marker to the result/acknowledgement data packets associated with the primary DBMS 145 acknowledging execution of the commit statement. According to one embodiment, the marker comprises a location marker, such as, for example, a sequence number from the primary DBMS 145. Then, as disclosed, the result/acknowledgement data packets are transmitted with their marker to the import process 270. According to one embodiment, the import process 270 recognizes the marker placed on the data packets associated with the commit statement, and recognizes that the entire transaction has been executed by the primary DBMS 145 against the data files 130. Therefore, the import process 270 deletes the data packets associated with the now finalized transaction from the queue 275.

Based on the foregoing, the protocol shadow 225 and the import process 270 advantageously work together to ensure that only the data packets associated with open transactions remain in the queue 275.

The primary connection 205 also stores the statistics 215 related to the connection with the client 105 in the memory 210. In one embodiment, the statistics include sufficient information for the monitor process 220 to determine whether the primary connection 205 has failed, is processing an unbalanced or overloaded workload, or the like, and whether the secondary connection 245 has failed, is processing an unbalanced or overloaded workload, or the like. For example, the statistics 215 can include the number of clients seen by the primary connection 205, the number of clients seen by the secondary connection 245, the status of communication with secondary communication manager 150, or the like. The primary connection 205 acquires the statistics 215 corresponding to information from the secondary connection manager 150 through the connection between the primary connection 205 and the secondary connection 245. Moreover, according to one embodiment, the foregoing status of the secondary communication manger 150 can be ascertained through straightforward ping or ping-like commands.

Fail-Over

Figure 3:
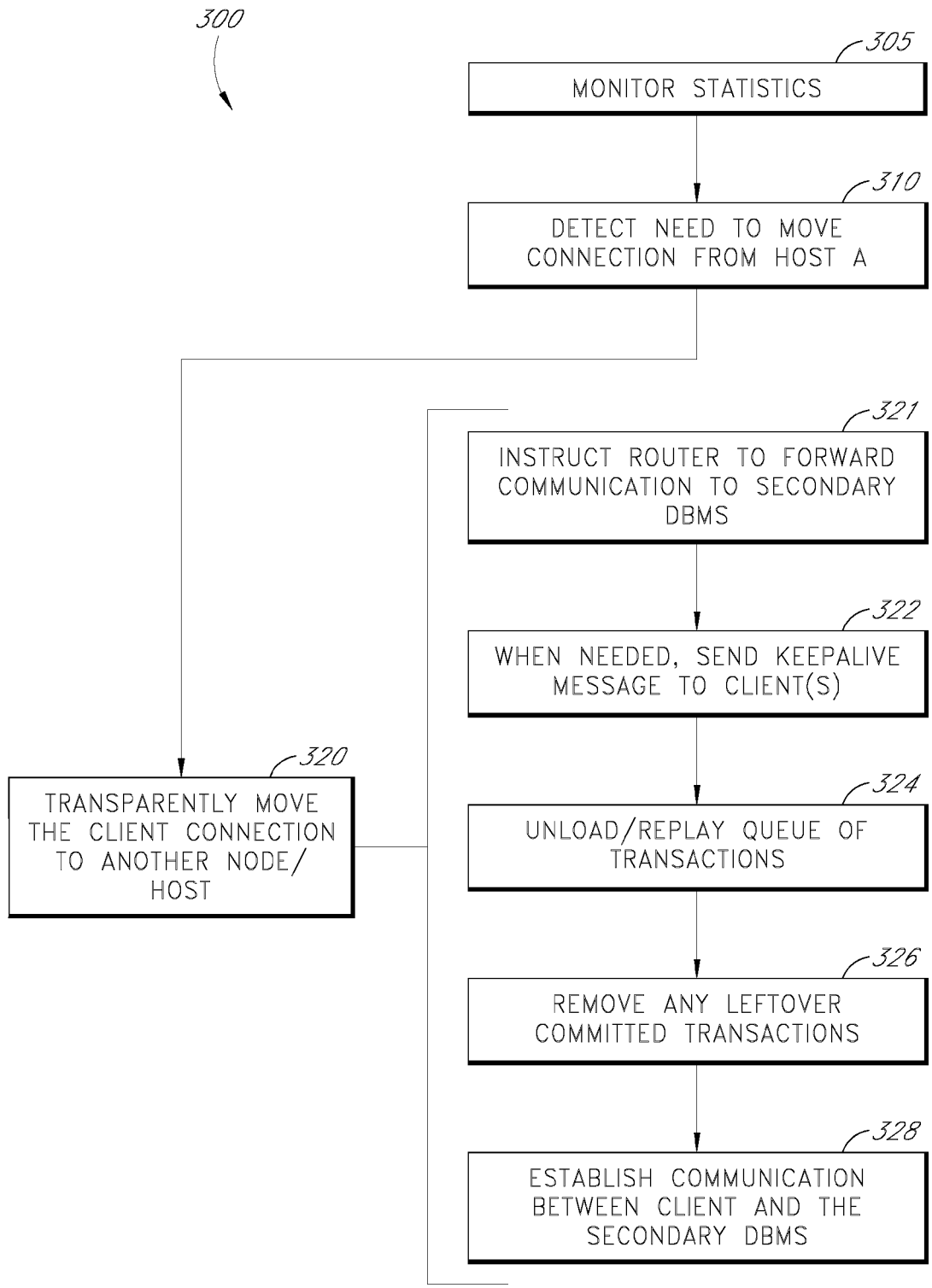
FIG. 3 illustrates a flow chart of a fail-over process, according to embodiments of the invention.

FIG. 3 illustrates a flow chart of a fail-over process 300, according to embodiments of the invention. As shown in FIG. 3, the fail-over process 300 begins with BLOCK 305 where the cluster 110 monitors the statistics of one or more connections with one or more clients. In the foregoing example, the monitoring corresponds to the monitor processes 220 and 260. In BLOCK 310, the cluster 110 detects the need to move the connection from one DBMS to another. For example, the monitor 260 may determine that the primary DBMS 145 has failed, become unbalanced, overloaded, or the like, and determine that the secondary connection manager 150 should assume the connection with the client 105. When the determination that a connection move is desired, the fail-over process 300 proceeds to BLOCK 320, where the cluster 110 moves the connection from one DBMS to another without losing the connection or causing even a non-fault tolerant client to fail. For example, the secondary connection 245 can communicate with the routing device 120 to assume the IP address (or VIP) of the primary DBMS 145. Additionally, the secondary connection manager 150 can replay all statements of open transactions which were rolled back in the data files 130. Accordingly, the move is transparent to the client 105 who does not lose the connection and does not know that a change has been made.

According to one embodiment, BLOCK 320 can include SUBBLOCK 321, where the cluster 110 instructs the routing device 120 to forward communication from the client to another DBMS. For example, as disclosed, the secondary connection 245 can assume the IP address of the primary DBMS 145. BLOCK 320 can also include SUBBLOCK 322, where the cluster 110 can send a keepalive message to one or more clients to ensure against failure of the connection to the same. According to one embodiment, the client 105 resends data packets which are not responded to or otherwise acknowledged by the cluster 110. When the client 105 resends the same data packets a predetermined amount of times, the client 105 may register a failure of the connection, thereby causing non-fault tolerant clients (such as those clients not programmed to recover) to also fail. Thus, during the fail-over process 300, the cluster 110 can respond to the client 105 with a message or acknowledgement that keeps the client 105 from resending the same data packets, therefore keeping the client from determining that the connection has failed. According to one embodiment, the secondary connection 245 sends the foregoing keepalive messages.

BLOCK 320 of the fail-over process 300 can also include SUBBLOCK 324 where the cluster 110 replays any statements from open transactions that were rolled back during the failure of the primary DBMS 145. For example, the replay process 280 can access the queue 275 to retrieve data packets associated with rolled back transactions and to forward them to the protocol shadow 265. For example, as disclosed in the foregoing, the import process 270 removes the statements associated with all finalized or committed transactions, thereby leaving only rolled back transactions in the queue 275.

BLOCK 320 of the fail-over process 300 can also include SUBBLOCK 326 where the cluster 110 removes any leftover committed transactions that may have slipped through. For example, it is possible that Host A 125 can fail after the primary DBMS 145 executes a commit statement for a particular transaction, but before the result/acknowledgement of the same can be transmitted to the import process 270. Thus, the secondary connection manager 150 believes the statements associated with the foregoing transaction were rolled back, e.g., because they were left in the queue 275, and therefore, the replay process 280 will forward the already committed statements to the protocol shadow 265. In one embodiment, the protocol shadow 265 parses the log file 285 of the primary DBMS 145 to ensure a commit statement associated with the open transaction was not received. When the protocol shadow 265 determines that a commit statement was received, the protocol shadow 265 deletes the statements associated therewith before their associated data packets are forwarded to the secondary DBMS 155 to be executed against the data files 130.

BLOCK 320 of the fail-over process 300 can also include SUBBLOCK 328 where the cluster 110 establishes communication between the client and the secondary DBMS. For example, after all rolled back statements are either executed against the data files 130 through the secondary DBMS 155 or deleted from the queue 275 by the protocol shadow 265, the protocol shadow 265 begins accessing new data packets stored in the memory 250 by the secondary connection 245 after it assumed the connection to the client 105 from the primary connection manager 140. Thus, after bringing the secondary DBMS 155 back up to the point of failure of the primary DBMS 145, the secondary connection manager 150 performs operations similar to the normal operations of the primary connection manager 140 as disclosed above.

According to one embodiment, the system administrator of the database cluster 110 can designate whether the secondary connection manager 150 through the monitor process 260 fails-back to the primary connection manager 140 after the cause of failure of the same is repaired, or whether the secondary connection manager 150 simply becomes the primary and vice versa.

Although the foregoing invention has been described in terms of certain preferred embodiments, other embodiments will be apparent to those of ordinary skill in the art from the disclosure herein. For example, the data packets captured from the primary connection manager 140 can be replicated to other DBMSs by replaying the same on the other DBMSs. This replication has several advantages over other replication techniques including a potential reduction in the traffic keeping the database cluster synchronized, thereby advantageously providing economical replication of geographically diverse data files.

The captured data packets can also be used to assist a transaction log based replication system. For example, the data packets can be directed to the other databases in the cluster prior to committing the transactions. Accordingly, committed transactions on a particular DBMS are not lost when the DBMS fails, as these transactions may advantageously be replayed on the other DBMSs in the cluster.

The captured data packets can also be used to assist a transaction log based replication system when posting replicated modifications. Some modifications (such as a vertical table update or DDL operation) may be difficult to replicate via a log-based replication. When the original data packets are available, posting the original SQL rather than the data from the transaction log may be more efficient and straightforward.

Figure 4:
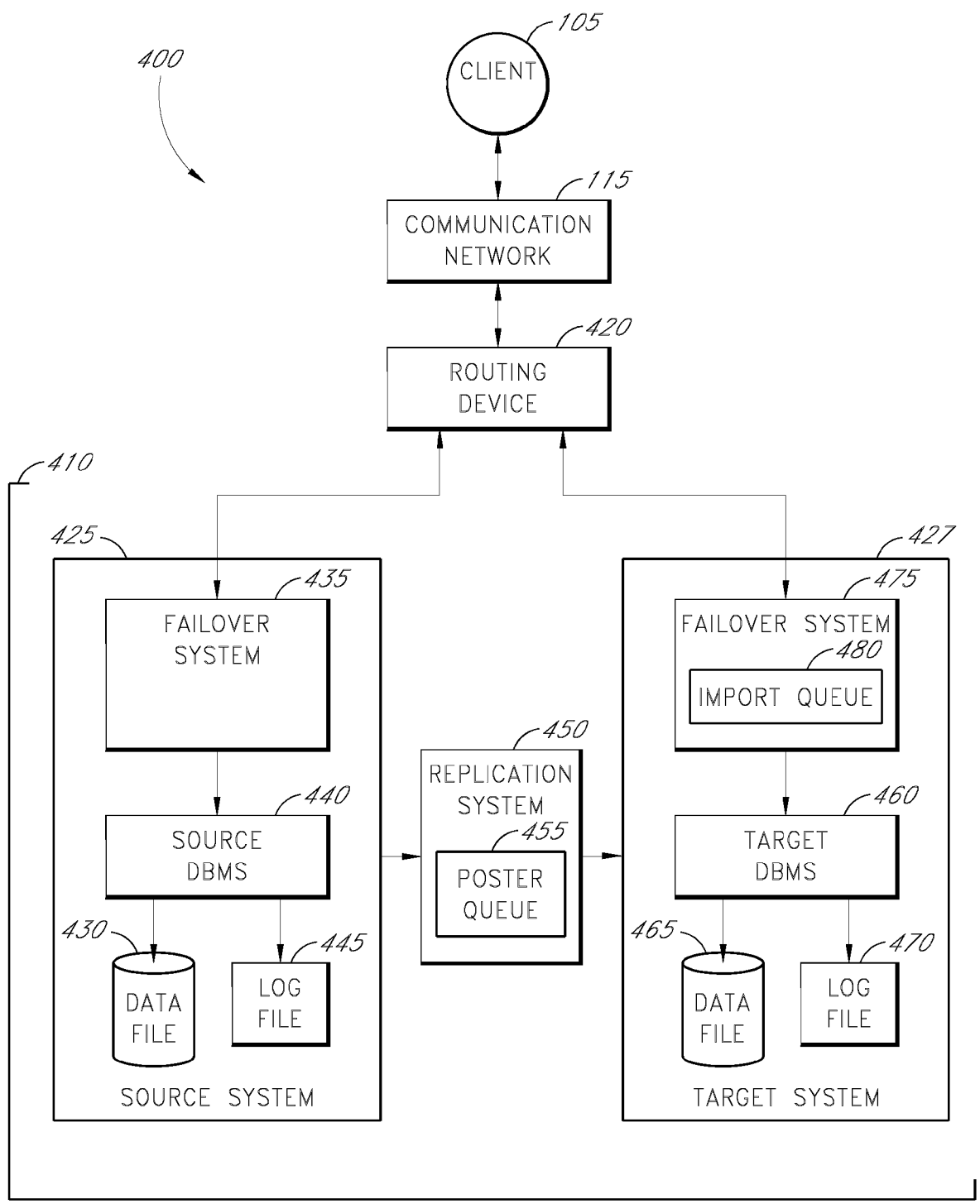
FIG. 4 illustrates a block diagram of an exemplary data processing system including a database cluster having at least some data files under replication according to embodiments of the invention.

FIG. 4 illustrates a block diagram of an exemplary data processing system 400, according to an embodiment of the invention. As shown in FIG. 4, the data processing system 400 includes a client application program 105 (client 105) communicating with a highly available database cluster 410 (cluster 410) through a communication network 115. The client 105 and communication network 115, as illustrated in FIG. 4, respectively are substantially similar to the client 105 and the communication network 115 illustrated in FIG. 1 and disclosed in the foregoing.

In one embodiment, the client 105 connects to the cluster 410 through the communication network 115. The client 105 issues instructions or transactions including one or more operational statements to be carried out against data stored in one or more data files accessible by the cluster 410. When the cluster 410 has executed the instructions or transactions, the cluster 410 returns an indication of the same to the client 105. Moreover, the cluster 410 can move the foregoing connection with the client 105 from a source system 425 to a target system 427 in the event of, for example, a failure of the source system 425, an unbalanced or overloaded work load present on the source system 425, or the like. Additionally, in one embodiment, the cluster 410 can provide communication in a native protocol of the underlying two or more DBMSs, thereby providing fault considerate connections for the potentially geographically remote and potentially non-fault tolerant client 105. For example, the cluster 410 can monitor a connection at the DBMS communication level, such as, for example, a SQL*Net level. The cluster 410 can capture enough information about the connection to restore the connection to its current state on another DBMS within the cluster.

FIG. 4 also shows the cluster 410, including a routing device 420 communicating with the source system 425 to execute transactions against one or more data files 430. Additionally, FIG. 4 also shows the routing device 420 having the ability to communicate to a target system 427, which in turn includes the ability to execute transactions against one or more data files 465 accessible by the target system 427.

According to one embodiment, the source system 425 includes a fail-over system component 435. The source system 425 includes a source DBMS 440 which executes transactions against the data file 430 and stores a record of those executed transactions in a log file 445.

The source system 425 communicates with a replication system 450 comprising a poster queue 455. The replication system 450 also communicates with the target system 427. The target system comprises fail-over system component 475 that includes an import queue 480. The target system 427 also comprises a target DBMS 460, which executes transactions against the data file 465 and stores a record of those transactions in log file 470.

In general, a transaction requested by the client 105 is accepted by the source system 425. The fail-over system 435 forwards a copy of the transaction to the target system 427 where it is placed in memory, such as the import queue 480. The fail-over system. 435 forwards the transaction to the source DBMS 440, which applies or executes the transaction against the data file 430 and records the transaction in the log file 445. The replication system 450 extracts the record from the log file 445 and transmits it to the fail-over system 427. The transaction from the replication system 450 is compared against those in the import queue 480, and committed transactions are purged from the import queue 480. The transaction from the replication system 450 is then forwarded to the target DBMS 460 where it is applied against the data file 465.

Although described by its preferred embodiment, a skilled artisan will recognize from the disclosure herein alternatives to the general functionality of the highly available database cluster 410. For example, the transaction information from the import queue 480 can advantageously be forwarded to the target system DBMS 460, rather than the matching transaction from the replication system 450. Also, in one embodiment, the replication system 450 may be implemented in any location, including but not limited to one or more of the source system 425, the target system 427, and other systems. Additionally, other combinations, omissions, substitutions and modifications will be apparent to the skilled artisan in view of the disclosure herein.

Figure 5A:
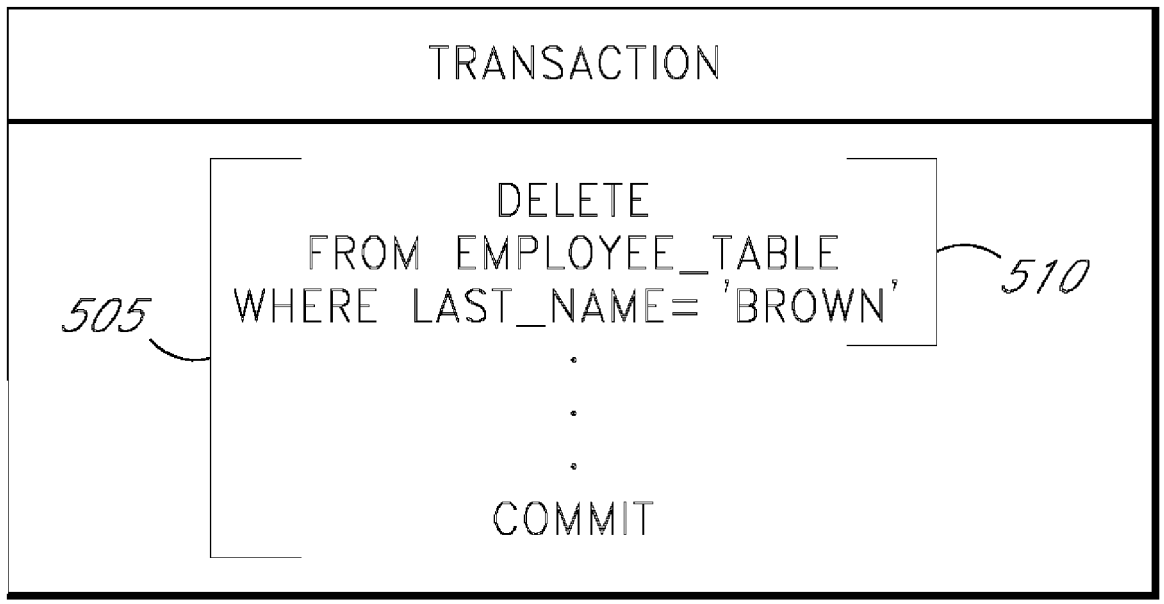
FIG. 5A illustrates an exemplary transaction processed by the data processing system of FIG. 4.
Figure 5B:
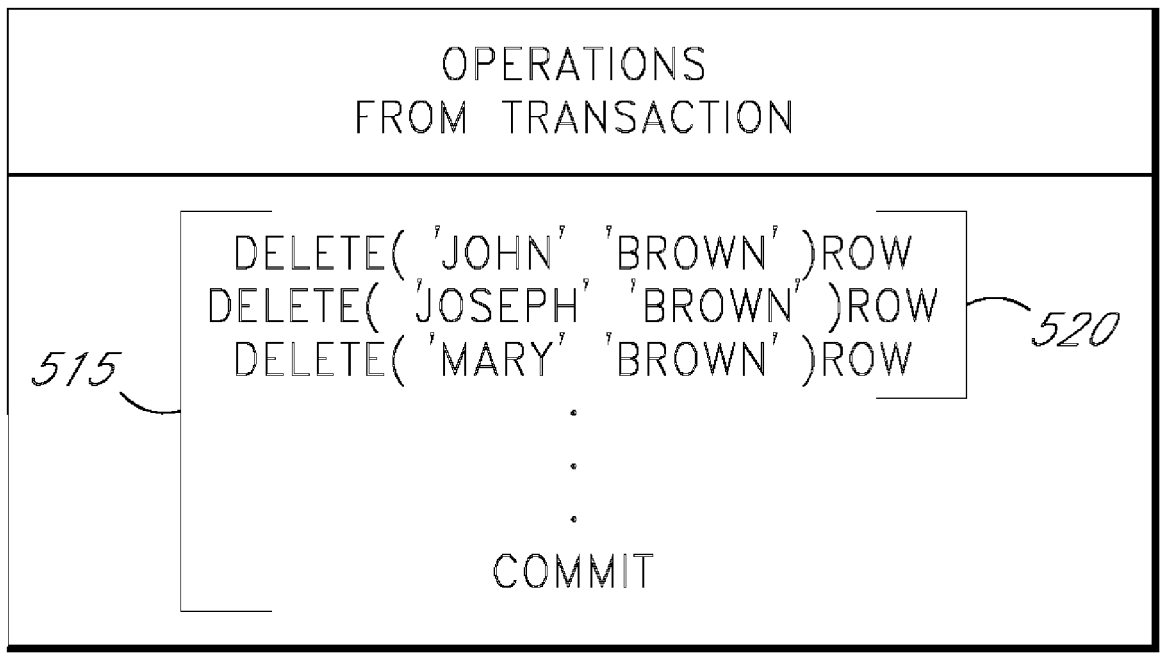
FIG. 5B illustrates exemplary operations that may be generated from the transaction of FIG. 5A.

FIG. 5A illustrates an exemplary higher level representation of a database transaction 505 comprising one or more statements (e.g., statement 510). When the transaction 505 is applied by a DBMS (e.g., the source DMBS 440 or the target DBMS 460), the DBMS may generate a set of lower level operations (e.g., operations 520) for a transaction, as illustrated in FIG. 5B. For example, the transaction 505 is represented as a set of operations 515. The DBMS may advantageously apply the generated operations to a data file (e.g., the data file 430 or the data file 465) or the like and store a record of the generated operations in a log file (e.g., the log file 445 or the log file 470).

Normal Operation

Figure 6:
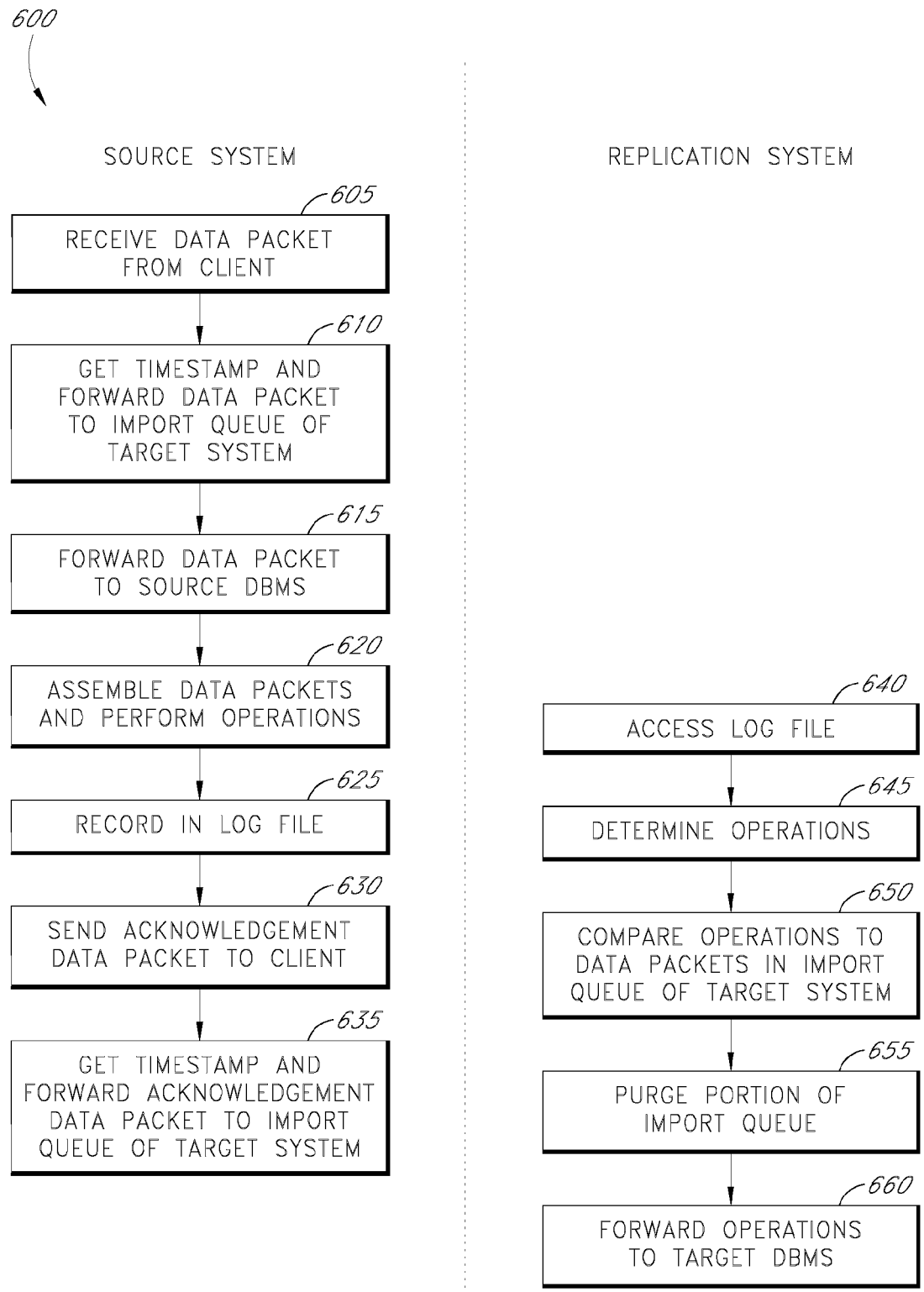
FIG. 6 illustrates a flow chart of a replication process executed on the data processing system of FIG. 4, according to embodiments of the invention.
Figure 7:
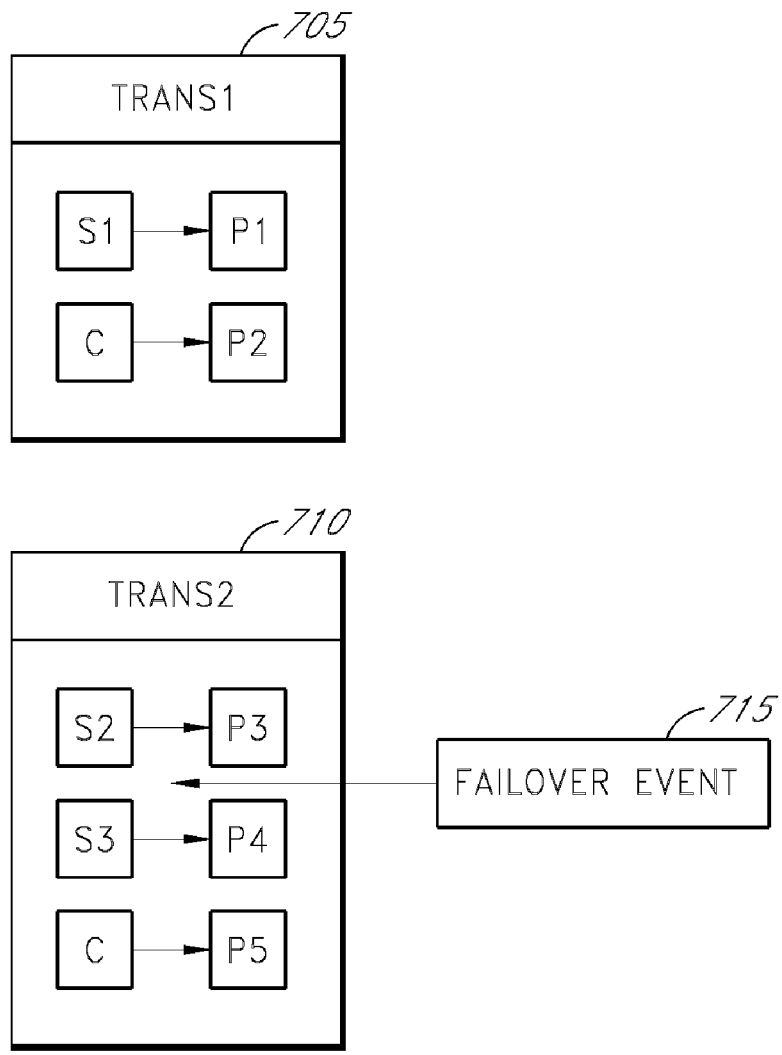
FIG. 7 illustrates a flow chart of a fail-over process executed on the data processing system of FIG. 4, according to embodiments of the invention.
Figure 8:
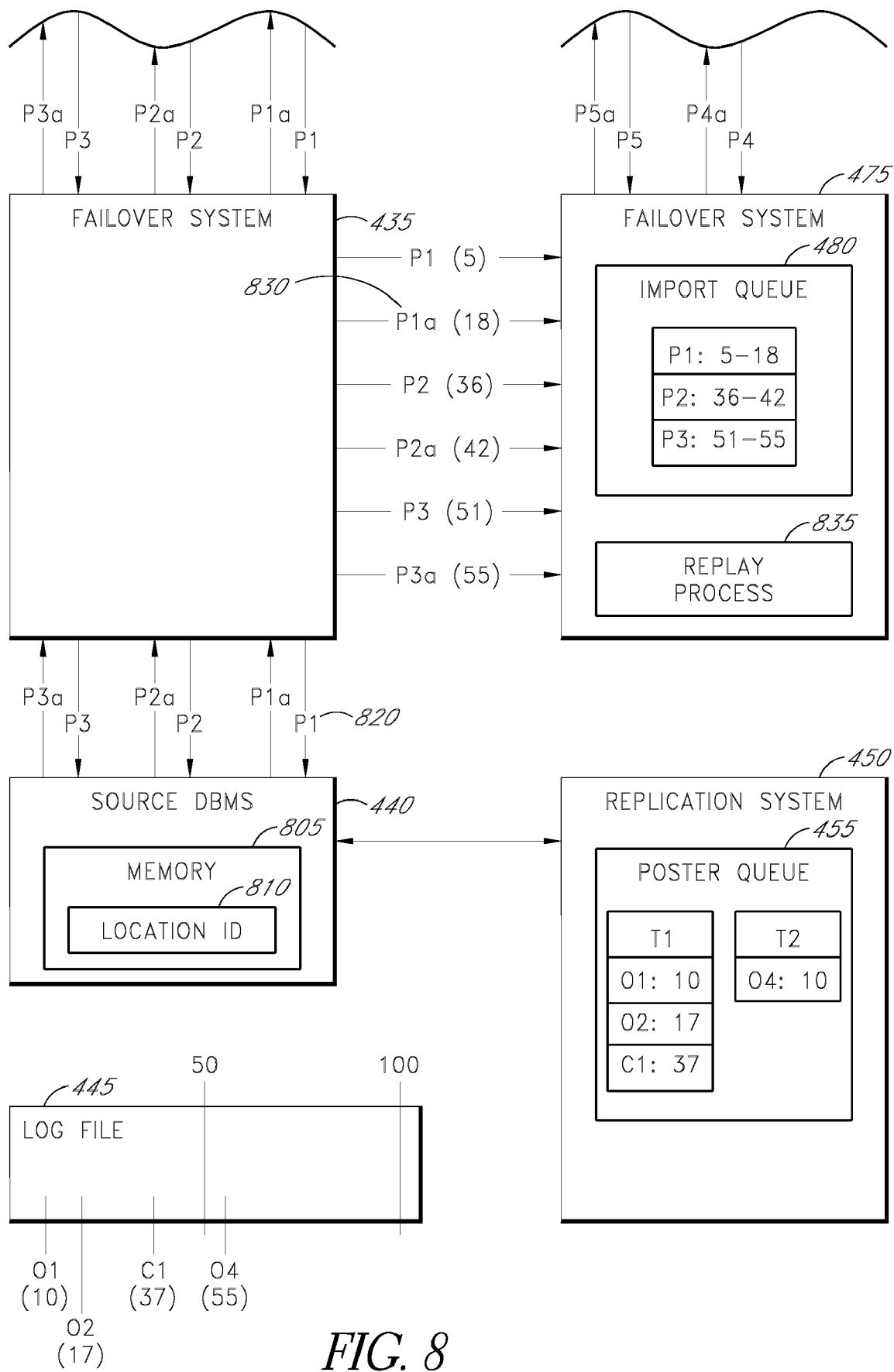
FIG. 8 illustrates a block diagram of an exemplary data processing system including at least some data files under replication according to embodiments of the invention.

FIG. 6, FIG. 7, and FIG. 8 illustrate the normal operation of the data processing system 400, according to one embodiment of the invention. As shown in FIG. 6 at a BLOCK 605, the source system 425 receives one or more data packets from the client 105. A set of data packets preferably corresponds to one or more transactions (e.g., transactions 705 and 710). For example, as illustrated in FIG. 7 the transaction 705 may be transmitted by the client 105 as packets P1 and P2. A statement, a commit command, or the like may correspond to one or more packets; however, for illustration purposes, a statement S1 corresponds to the packet P1 and a commit command corresponds to the packet P2.

At a BLOCK 610, the source system 425 forwards the data packet P1 to the target system 427. For example, in one embodiment, the fail-over system 435 of the source system 425 accesses a memory 805 of the source DBMS 805 to determine a current timestamp. In one embodiment, the timestamp comprises a location ID 810 that preferably identifies a location in the log file 445, such as a current location of operations being stored in the log file 445. The fail-over system 435 forwards the data P1 packet with a corresponding location ID 810 (e.g., data packet and location ID "5") to the fail-over system 475, which places the packet into the import queue 480.

At a BLOCK 615, the data packet P1 is forwarded to the source DBMS 440. For example, in one embodiment, the fail-over system 435 forwards the data packet P1 (e.g., data packet 820) to the source DBMS 440. At a BLOCK 620, the source DBMS 440 assembles one or more the data packets into transactions and performs the transaction-related operations on the data file 430.

At a step 625, the source DBMS stores in the log file 445 a record of the changes to the data file 430. In one embodiment, the source DBMS 440 stores a record of the changes in a buffer, the contents of which the source DBMS 440 periodically writes to the log file 445. In one embodiment, the source DBMS 440 stores a record of the changes in a buffer, the contents of which the source DBMS 440 writes to the log file 445 in response to receiving a commit command.

At the BLOCK 630, the source system 425 sends an acknowledgement data packet, corresponding to the data packet received at the BLOCK 605 to the client 105. For example, in one embodiment, the source DBMS 440 sends an acknowledgement data packet P1a to the fail-over system 435, which forwards the acknowledgement data packet to the client 105. In one embodiment, the source DBMS 440 sends the acknowledgement packet to the client after the changes corresponding to a data packet are written from the buffer to the log file 445.

At a BLOCK 635, the source system 425 forwards the acknowledgment data packet P1a to the target system 427. For example, in one embodiment, the fail-over system 435 of the source system 425 accesses the memory 805 of the source DBMS 440 to determine another timestamp, such as the foregoing location ID 810. The fail-over system 435 forwards a data packet with a corresponding location ID 810 (e.g., data packet P1a and location ID "18") to the fail-over system 475, which places the packet into the import queue 480.

As illustrated in FIG. 6, the client/source system communication process occurs concurrently with a replication process. In one embodiment, replication is performed in a manner substantially the same as described in U.S. patent application Ser. No. 09/782,586, filed Feb. 12, 2001, entitled "System and Method for Reconciling Transactions Between a Replication System and a Recovered Database," now U.S. Pat. No. 7,065,538, issued Jun. 20, 2006, which claims the benefit of U.S. Provisional Application No. 60/182,073, filed Feb. 11, 2000, the disclosures of which are incorporated herein by reference.

In one embodiment, in a replication process at a BLOCK 640, the replication system 450 accesses the log file 445. At a BLOCK 645, the replication system 450 parses the log file 445 to identify records of operations that have been applied to data file 430 and stores the records of the operations in the poster queue 455. In an embodiment, the application of the records of the operations to another DBMS causes the other DBMS to make changes similar to, or identical to, those made in the original data file. In addition to parsing the log file 445 to obtain the records of operations, the replication system 450 also determines a timestamp associated with the records of each operation. In one embodiment, the timestamp corresponds to the actual location of the record in the log file 445.

At a BLOCK 650, the timestamps associated with the operations in poster queue 455 are compared to the timestamp ranges associated with the data packets in the import queue 480. At a BLOCK 655, when a commit is found in the poster queue 455, the data packets in the import queue 480 associated with a transaction having an appropriate timestamp range are purged. At a BLOCK 660, operations for a committed transaction in the poster queue 455 are then forwarded to the target DBMS 460, which applies the operations to data file 465 and stores appropriate records in log file 470.

FIG. 8 illustrates a simplified example of data flow during the process 600. For example, the location ID are referred to herein for clarity of disclosure as simple digits. However, a skilled artisan will recognize from the disclosure herein that the location ID may be much more complex, such as, for example, the log location data including an offset. Moreover, in the following simplified example, packet P1 generates a record of two operations, O1 and O2 with commit C1 in the log file 445, while packet P2 generates a record of operation O4.

As shown in FIG. 8, the packet P1 is received, sent to the source DMBS 440, and forwarded with a corresponding location ID value of "5" to the fail-over system 475. The value of "5" corresponds to the current value of the log file 445 at the time the packet P1 is received. For packet P1, the source DMBS 440 may generate operation O1 and operation O2, the record of which the source DMBS 440 writes to locations "10" and "17" respectively in the log file 445. The values of "10" and "17" occur because other client or DBMS processes may also be writing to the log file 445 in parallel such that the location ID is greater than the acquired "5." The source DMBS generates an acknowledgement data packet P1a for original packet P1. The acknowledgement data packet P1a is sent to the client 105 and is forwarded with a location ID value of "18" to the fail-over system 475. In the import queue 480, the fail-over system 475 associates the first location ID value of "5" and the acknowledgement location ID value of "18" with the packet P1 to derive a timestamp range of "5"-"18.".

Similarly, after packet P2 is received and acknowledged, the fail-over system 475 associates a location ID value of "36" and an acknowledgement location ID value of "42" with the packet P2. As the packets are forwarded to the fail-over system 475, the replication system 450 parses the log file 445 and stores operation O1, operation O2, and commit C1 in the poster queue 455. A replay process 835 determines that operation O1 and operation O2 correspond to P1, through, for example, recognition that the location ID values of operations O1 and O2 (respectively 10 and 17) fall within the timestamp range of numbers between and including the first location ID value for P1 (i.e., "5") and the location ID value of the acknowledgement packet for P1 (i.e., "18"). Similarly, the replay process 835 determines that commit C1 corresponds to P2. Accordingly, the replay process purges transaction 1 comprising packets P1 and P2 from the import queue 480 and forwards operation O1, operation O2, and commit C1 to the target DBMS 460.

Although described in an exemplary embodiment, an artisan will recognize from the disclosure herein that a timestamp may be any suitable identifier (e.g., date, time, date & time, location ID, or the like). Further, the artisan will recognize from this disclosure that a location ID may be any suitable location-related identifier, including but not limited to a sequence number that identifies a particular log file with an offset associated with the log file. Further, the artisan will recognize from this disclosure that operations may, but need not, correspond directly with packets. Moreover, the artisan will recognize from the disclosure herein that the replay process could purge the operations and forward the packets P1 and P2 to the target DBMS 460.

Fail-Over with Replication

Figure 9:
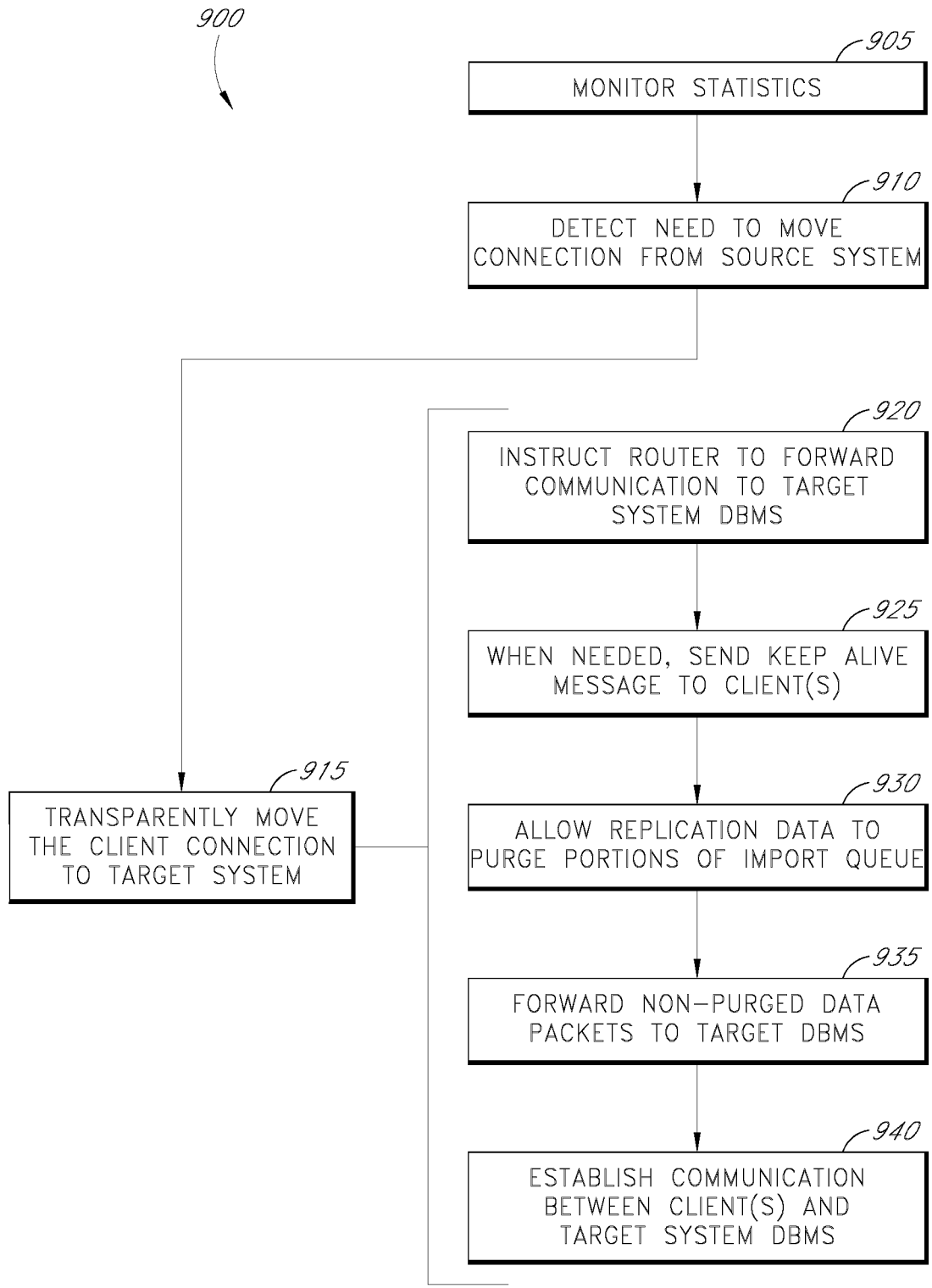
FIG. 9 illustrates a flow chart of a fail-over process, according to embodiments of the invention.

FIG. 7, FIG. 8, and FIG. 9 also illustrate an exemplary embodiment of the fail-over operation of the data processing system 400. As shown in a process 900 of FIG. 9, at a BLOCK 905, the cluster 410 monitors the statistics of one or more connections with one or more clients 105.

As the cluster 410 monitors the statistics of one or more connections with one or more clients 105, the one or more clients 105 perform one or more transactions in a manner substantially similar to that shown in FIG. 6, FIG. 7, and FIG. 8. For example, as illustrated, packet P1, packet P2, and packet P3 are received from the client 105. However, after packet P3 is received and acknowledged by the source system 425, the cluster 410 detects the need (e.g., fail-over event 715 in FIG. 7) to move the connection from one DBMS to another at a BLOCK 910. Reasons for determining the need to move the connection in FIG. 9 can be substantially similar to the reasons to move the connection as described herein with reference to FIG. 3 or other reasons that will be recognizable from the disclosure herein to one of skill in the art.

When the determination that a connection move is desired, the cluster 410, at BLOCK 915, moves the connection from one DBMS to another without losing the connection or causing a non-fault tolerant client to fail.

According to one embodiment, BLOCK 915 includes SUBBLOCK 920, where the cluster 410 instructs the routing device 420 to forward communication, such as, for example, the packets, from the client 105 to another DBMS. For example, as disclosed, the target system 427 can assume the IP address of the source system 425.

BLOCK 915 can also include SUBBLOCK 925, where the cluster 410 can send a keepalive message to one or more clients to ensure against failure of the connection to the same. According to one embodiment, the client 105 resends data packets which are not responded to or otherwise acknowledged by the cluster 410. When a client 105 resends the same data packets a predetermined amount of times, the client 105 may register a failure of the connection, thereby causing non-fault tolerant clients such as those clients not programmed to recover to also fail. Thus, during the fail-over process 900, the cluster can respond to the client 105 with a message or acknowledgement that keeps the client 105 from resending the same data packets, therefore keeping the client from determining that the client has failed. According to one embodiment, the target system 427 sends the foregoing keepalive messages. In one embodiment, the fail-over system 475 sends the foregoing keepalive messages.

BLOCK 915 of the fail-over process 900 can also include SUBBLOCK 930 in which any committed transactions in poster queue 455 are applied to the import queue 480 of the target DBMS 460 and the corresponding data packets or related operations in the import queue 480 are purged. For example, the replay process 835 purges P1 and P2 from the import queue 480 and corresponding operations from the replication system 450 are forwarded to the target DBMS 460.

At a BLOCK 935, any remaining non-purged data packets corresponding to, for example, non-committed transactions in the import queue 480 are then forwarded to the target DBMS 460 and are applied to the target DBMS 460 in a manner similar to the normal operation of the source system 425. For example, data packet P3 is forwarded to the target DBMS 460.

At a step 940, the communication between the one or more clients and the target system 427 is continued, wherein the one or more clients begin sending additional communications or data packets (e.g., data packets P4 and P5), which are acknowledged (e.g., acknowledgement data packets P4a and P5a).

The embodiments illustrated in and described with reference to FIG. 4 may advantageously provide a cluster with fail-over among different database management systems that access different data files. The embodiments preferably provide fail-over without losing client connections, which are particularly valuable in critical, always-on applications, such as those associated with Internet-based applications. Also, the embodiments may advantageously transfer a connection among different database management systems that access different data files to provide load balancing.

Figure 10:
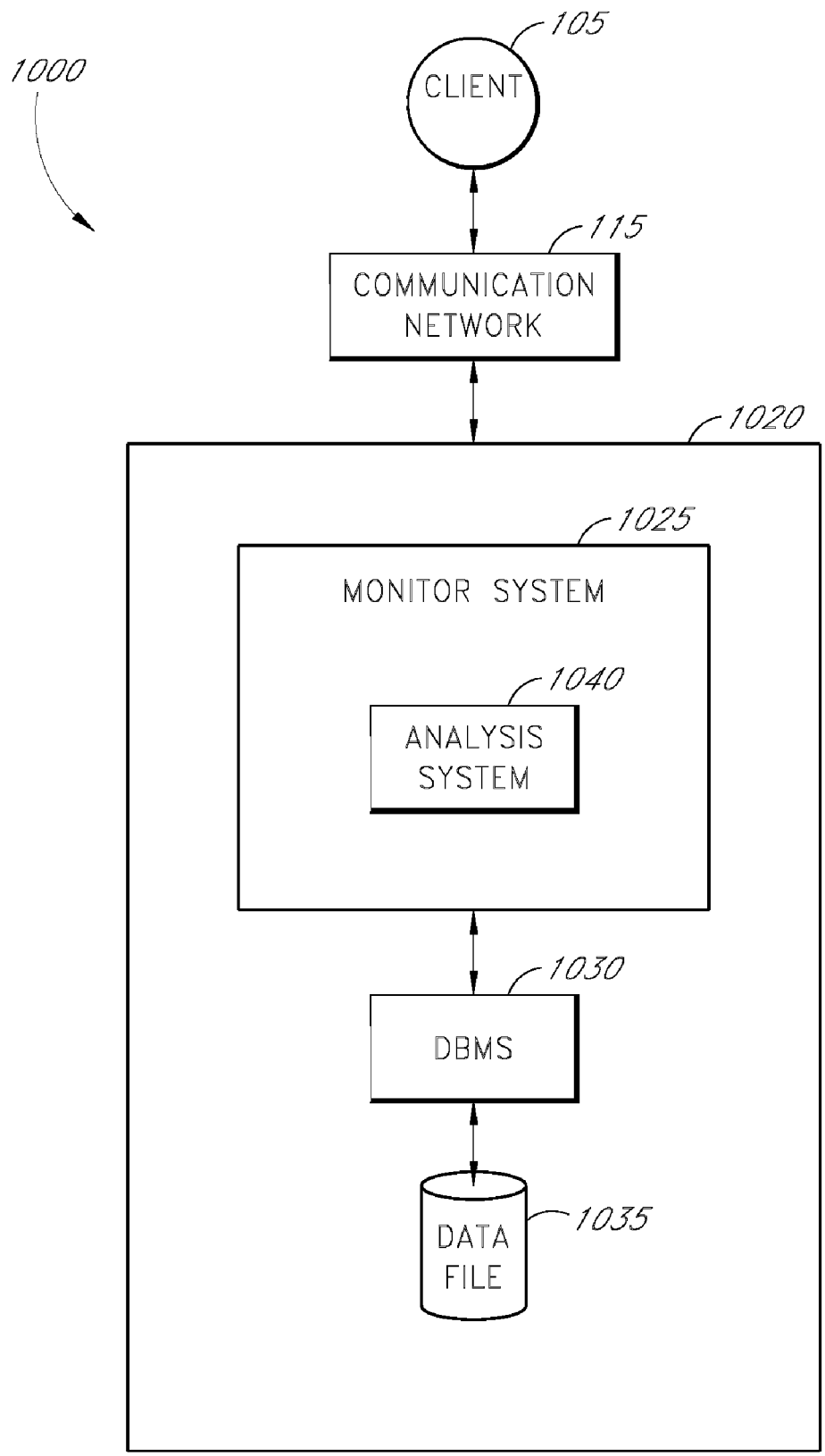
FIG. 10 illustrates a block diagram of an exemplary data processing system according to embodiments of the invention.

FIG. 10 illustrates a block diagram of an exemplary data processing system 1000, according to an embodiment of the invention. As shown in FIG. 10, the data processing system 1000 includes a client application program 105 (client 105) communicating with a host computer system (host 1020) through a communication network 115. The client 105 and communication network 115, as illustrated in FIG. 10, respectively are substantially similar to the client 105 and the communication network 115 illustrated in FIG. 1 and disclosed in the foregoing.

In one embodiment, the client 105 connects to the host 1020 through the communication network 115. The client 105 issues instructions or transactions including one or more operational statements to be carried out against data stored in one or more data files accessible by the host 1020. The host 1020 advantageously includes the ability to execute transactions against the data files 1035. When the host 1020 has executed the instructions or transactions, the host 1020 returns an indication of the same to the client 105.

According to one embodiment, the host 1020 includes a monitor system 1025, a DBMS 1030 that executes transactions against the data file 1035, and an analysis system 1040. The analysis system 1040 may be located in any suitable location including the host 1020, one or more computer systems other than the host 1020, or any suitable combination of both. The monitor system 1025 may be located in any suitable location including the host 1020, one or more computer systems other than the host 1020, or any suitable combination of both.

In one embodiment, a transaction requested by the client 105 is accepted by the host 1020. The monitor system 1025 receives the transaction, and the analysis system 1040 determines whether the transaction should be altered (e.g., modified, replaced, delayed, reordered, or the like). If the analysis system 1040 determines that the transaction should be altered, the monitor system 1025 alters the transaction accordingly. The monitor system 1025 then forwards the transaction-altered or not altered-to the DBMS 1030 for execution against the data file 1035.

In one embodiment, when the DBMS 1030 has executed the instructions or transactions, the DBMS 1030 returns an indication of the same to the client 105. In some instances, the DBMS 1030 returns data from the data file 1035 to the client 105. The monitor system 1025 advantageously receives the indication, data, or both from the DBMS 1030. The analysis system 1040 determines whether the indication, data, or both should be altered (e.g., modified, replaced, or the like). If the analysis system 1040 determines that the indication, data, or both should be altered, the monitor system 1025 then alters the indication, data, or both. The monitor system 1025 forwards the indication, data, or both-altered or not altered-to the client 105.

Figure 11:
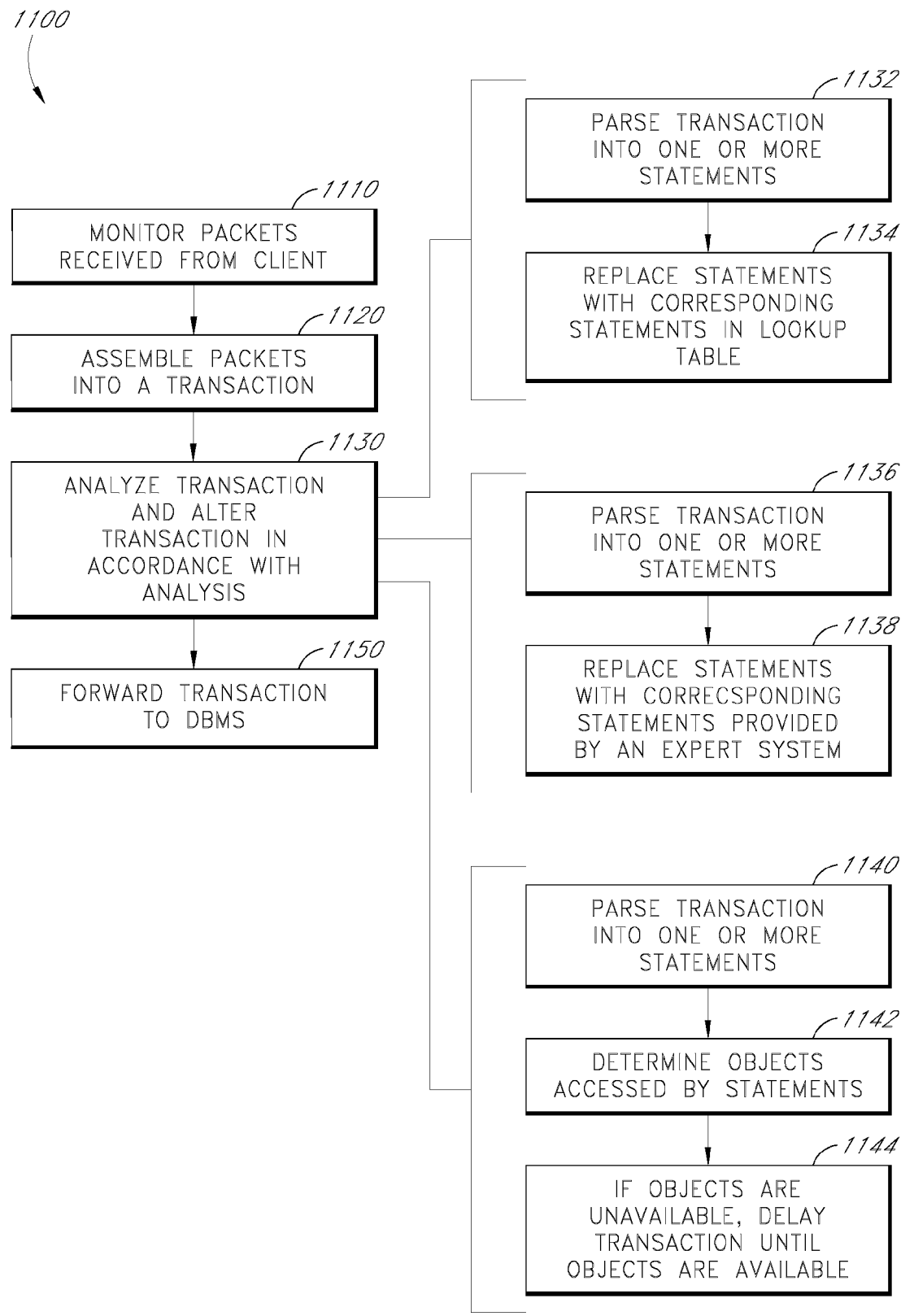
FIG. 11 illustrates a flow chart of a monitoring process, according to embodiments of the invention.

FIG. 11 illustrates the operation of the data processing system 1000, according to various embodiments. In a process 1100, at a BLOCK 1110, the host 1020 receives one or more data packets from the client 105. A set of data packets preferably corresponds to one or more operations, statements, transactions or the like associated with one or more transactions. At a BLOCK 1120, the host system 1020 assembles the data packets into a transaction. For example, in one embodiment, the monitor system 1025 receives and assembles the data packets into a transaction.

At a BLOCK 1130, the host 1020 analyzes the transaction to determine whether the transaction should be altered and, if so, alters the transaction accordingly. For example, in one embodiment, the analysis system 1040 includes a lookup table (not shown) that associates statements with other corresponding statements. The analysis system 1040 parses the transaction into one or more statements at a BLOCK 1132 and determines whether a parsed statement is in the lookup table. If the parsed statement is in the lookup table, at a BLOCK 1134, the monitor system 1025 replaces the parsed statement in the transaction with a corresponding statement from the lookup table. In an embodiment, the lookup table may be populated with more efficient or other alternatives for various common or uncommon operations, statements, transactions or the like, such as, for example, alternative selected for specific hardware, software, or combination of the same, specific indices, views, or the like related to the data in the data file, or the like. The alternatives may be generated from past experiences, one or more administrators, groups of administrators, performance monitoring software, or other information gathered relating to particular hardware, software, or combinations of the same, or the like.

In one embodiment, the analysis system 1040 includes an expert system (not shown). The analysis system 1040 parses the transaction into one or more statements at a BLOCK 1136. The expert system advantageously determines whether a parsed statement should be replaced. If the expert system determines that a parsed statement should be replaced with another statement, at a BLOCK 1138, the monitor system 1025 replaces the parsed statement in the transaction with that other statement. In one embodiment, the expert system comprises some or all of the features provided in SQLAB VISION™ and SQLAB EXPERT™, which are software programs commercially available from Quest Software, Inc. of Irvine, Calif. For example, in one embodiment, the expert system may analyze information from various sources, such as, for example, current, past, or combinations of performance statistics, hardware, software or combination system or component profiles, loads on the database cluster or portions thereof, in order to recommend or replace the parsed statement with an alternative.

In one embodiment, at a BLOCK 1140, the analysis system 1040 parses the transaction into one or more statements. At a BLOCK 1142, the analysis system 1040 determines which database objects (not shown) are accessed by the one or more statements. The database objects are preferably within, or otherwise associated with, the DBMS 1030.

For example, in one embodiment, a maintenance software program (not shown) accesses a database object to perform maintenance on the database object, which renders the database object temporarily unavailable. Before accessing the database object, the maintenance software program advantageously places an entry in, for example, a lookup table (not shown), which entry corresponds to the unavailability of the database object. In this embodiment, to determine if a database object is unavailable, the analysis system 1040 accesses the lookup table to see if an entry corresponds to the object. After accessing the database object, the maintenance software program advantageously removes the entry corresponding to the database object. The maintenance software program may reside in any suitable location including the host system 1020, a computer other than the host system 1020, or both. In one embodiment, the analysis system 1040 includes an expert system that determines if a transaction should be delayed.

If the database objects are not available, at BLOCK 1144, the host system 1020 delays the transaction until the objects are available. If an entry does correspond to the objection, the analysis system 1040 preferably repeatedly checks the lookup table until the entry is no longer there. Accordingly, when the analysis system 1040 finds that the entry is no longer there, the analysis system 1040 advantageously executes the one or more statements. In an embodiment, the monitor system 1025 delays the transaction by sending keep alive messages or the like to the client 105. Although a transaction may be delayed for maintenance, a transaction may be delayed for any suitable purpose, including, but not limited to, load balancing (e.g., to delay a transaction that will use a substantial amount of resources, resources already in use or scheduled to be used, or the like). In one embodiment, when delaying a transaction for load balancing, an expert system analyzes the resources used by the one or more statements and delays their execution according to any suitable schedule. In an embodiment, transactions may be delayed for any suitable purpose, including but not limited to reordering transactions. In an embodiment, one or more statements within a transaction may be delayed for any suitable purpose, including but not limited to reordering statements within a transaction.

At a BLOCK 1150, the monitor system 1025 forwards the transaction-altered or not altered-to the DBMS 1030 for execution against the data file 1035. The transaction may be forwarded to the DBMS using any suitable method, including but not limited to packets.

Figure 12:
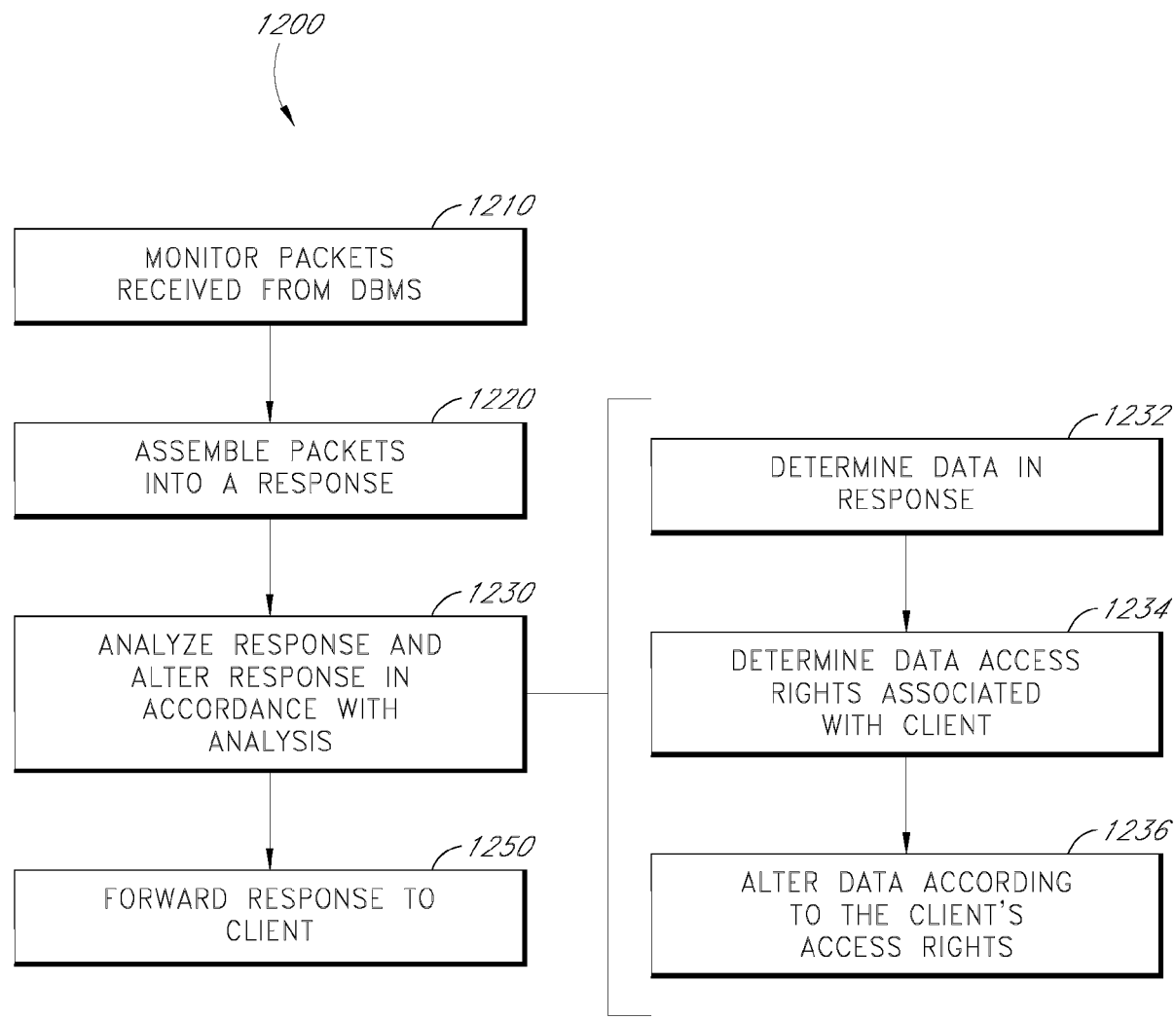
FIG. 12 illustrates a flow chart of a monitoring process, according to embodiments of the invention.

FIG. 12 illustrates the operation of the data processing system 1000, according to various embodiments.

In a process 1200, at a BLOCK 1210, the monitor system 1025 receives one or more data packets from the DBMS 1030. A set of data packets preferably corresponds to one or more responses from the DBMS 1030 to the client 105. At a BLOCK 1220, the monitor system 1025 assembles the data packets into a response.

At a BLOCK 1230, the monitor system 1025 analyzes the response to determine whether the response should be altered and, if so, alters the response accordingly. For example, in one embodiment, at a BLOCK 1232, the analysis system 1040 advantageously determines what data is included in a response.

At a BLOCK 1234, the analysis system 1040 advantageously determines whether any access rights are associated with the client and the data included in the response. For example, in one embodiment, the analysis system 1040 includes a set of access rights in a, for example, lookup table (not shown). In one embodiment, the analysis system 1040 includes a set of access rights comprising a set of rules that indicate at least one of the following for a client: one or more permitted database objects, one or more nonpermitted database objects, one or more permitted database requests, one or more nonpermitted database requests, one or more permitted responses, one or more nonpermitted responses, or the like. For example, the client 105 may have access rights to query a particular database table in a request (e.g., query a customer table), but may retrieve only a subset of the data within the table (e.g., retrieve data associated with a particular customer; retrieve nonsensitive data such as customer gender and purchase history, but not credit card data). Of course, a client may have any suitable combination of rights with any suitable combination database objects, database requests, and responses. Accordingly, because some clients may need greater or lesser access rights than other clients, clients may advantageously have customized sets of access rights.

At a BLOCK 1236, if access rights are associated with the client and the data included in the response, the monitor system 1025 advantageously alters the data according to the client's access rights. For example, if the client 105 requests credit card data, but does not have access rights to that data, the monitor system 1025 replaces the credit card data with data that does not represent the credit card data, such as a series of asterisks or the like. In one embodiment, if the client has access rights to the data, the monitor system 1025 need not alter the response. However, in other embodiments, responses are altered for any suitable purpose including but not limited to reasons other than those associated with access rights to data and reasons other than those associated with access rights generally.

At a BLOCK 1250, the host system 1020 forwards the response-altered or not altered-to client 105.

Referring to FIG. 4 and FIG. 10, in one embodiment, the source system 425 comprises the host system 1020. The failover system 435 may advantageously comprise the monitor system 1025. Accordingly, the embodiments illustrated in and described with reference to FIG. 4 may advantageously comprise embodiments illustrated in and described with reference to FIG. 11 and FIG. 12.

Although described by its preferred embodiment, a skilled artisan will recognize from the disclosure herein alternatives to the general functionality of the highly available database cluster 410. For example, the transaction information from the import queue 480 can advantageously be forwarded to the target system DBMS 460, rather than the matching transaction from the replication system 450. Also, in one embodiment, the replication system 450 may be implemented in any location, including but not limited to one or more of the source system 425, the target system 427, and other systems. According to another embodiment, software may be added just below the client 105, thereby providing a mechanism to replay incomplete transactions. For example, a typical client application does not access the database directly, but instead uses some type of intermediate layer such as ODBC or JDBC, OCI, or the like. The foregoing added software can advantageously replace this intermediate layer.

Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. A database cluster for providing client connection fail-over, the database cluster comprising:
   a first computing system comprising:
      a first management module configured to form a client connection with and receive at least one transaction from a client, and
      a first database management system (DBMS) in communication with the first management module to receive and execute the at least one transaction on data stored in one or more data files;
   a replication module configured to record replication data indicating changes made to the data stored in the one or more data files based on the at least one transaction; and
   a second computing system in communication with the replication module, the second computing system comprising:
      a second management module configured to receive a copy of the at least one transaction from the first computing system, the second management module being further configured to purge at least one of (i) the copy of the at least one transaction and (ii) the replication data when the copy of the at least one transaction is redundant to the replication data,
      wherein the second management module is configured to monitor a performance of the first computing system and the first management module is configured to monitor a performance of the second computing system,
      and wherein when the second management module determines that an unbalanced workload exists between the first and the second computing systems, the second management module transparently assumes the client connection and begins to receive additional transactions from the client to be executed against the one or more data files.

2. The database cluster of claim 1, further comprising a second DBMS in communication with the second management module, the second DBMS being configured to access data stored in the one or more data files.

3. The database cluster of claim 1, wherein the first management module and the second management module exchange statistics usable by the second management module to monitor the performance of the first computing system.

4. The database cluster of claim 3, wherein the statistics include a number of clients connected to the first management module.

5. The database cluster of claim 1, wherein the client connection comprises a Transmission Control Protocol/Internet Protocol (TCP/IP) connection.

6. The database cluster of claim 1, wherein the unbalanced workload comprises a failure of the first DBMS.

7. The database cluster of claim 1, wherein each of the at least one transaction and the replication data is associated with a timestamp.

8. The database cluster of claim 7, wherein the second management module is configured to determine if the at least one transaction is redundant to the copy of the replication data based on a comparison of the respective timestamps.

9. A method of providing transparent fail-over to a client connection, the method comprising:
   monitoring statistics of a client connection between a first database management system (DBMS) and a client, wherein said monitoring is performed by a connection manager of a second DBMS;
   replicating data between a first file in communication with the first DBMS and a second file in communication with the second DBMS;
   determining from the statistics a need, based on an unbalanced workload between the first DBMS and the second DBMS, to transparently move the client connection from the first DBMS to the second DBMS while keeping the client connection alive from a perspective of the client;
   rerouting the client connection to the second DBMS; and
   establishing communication between the second DBMS and the client over the client connection.

10. The method of claim 9, wherein said replicating data additionally comprises:
    receiving, with the first DBMS, a data request from the client to modify the first file;
    storing replication data indicating changes made to the data of the first file based on the data request;
    sending a copy of the data request to the connection manager of the second DBMS; and
    determining if the copy of the data request is redundant to the replication data, and when the copy of the data request is determined to be redundant to the replication data, purging one of (i) the copy of the data request and (ii) the replication data.

11. The method of claim 10, additionally comprising forwarding the non-purged data of (i) the copy of the data request or (ii) the replication data to the second DBMS.

12. The method of claim 10, additionally comprising associating a timestamp with the data request.

13. The method of claim 10, wherein said determining if the copy of the data request is redundant comprises comparing the timestamp of the data request with a timestamp of the replication data.

14. The method of claim 9, additionally comprising sending keep-alive messages to the client from the connection manager of the second DBMS.

15. The method of claim 9, additionally comprising replaying any statements from open transactions rolled back when the client connection was moved from the first DBMS.

16. The method of claim 9, wherein said determining the need includes detecting an unavailability of the first DBMS.

17. The method of claim 16, wherein the unavailability is caused by a failure of the first DBMS.

18. The method of claim 9, additionally comprising monitoring, with a connection manager of the first DBMS, a performance of the second DBMS.

19. A system for providing transparent fail-over to a client connection, the system comprising:
    means for monitoring statistics of a client connection between a first database management system (DBMS) and a client, said monitoring means being associated with a second DBMS;
    means for storing replication data indicating changes made to data of a first data file based on a transaction sent from the client to the first DBMS;
    means for receiving a copy of the transaction;

means for determining if the copy of the transaction is redundant to the replication data, and when the copy of the transaction is determined to be redundant to the replication data, purging one of (i) the copy of the transaction and (ii) the replication data;

determining from the statistics a need to transparently move the client connection to the second DBMS while keeping the client connection alive from a perspective of the client;

rerouting the client connection to the second DBMS; and establishing communication between the second DBMS and the client over the client connection.

20. The system of claim 19, further comprising second means for monitoring a performance of the second DBMS, wherein said second monitoring means is associated with the first DBMS.

* * * * *